US012018882B2

(12) United States Patent
Xia et al.

(10) Patent No.: US 12,018,882 B2
(45) Date of Patent: Jun. 25, 2024

(54) HINGE ASSEMBLY WITH DECORATIVE SHEET AND REFRIGERATOR HAVING THE SAME

(71) Applicants: QINGDAO HAIER REFRIGERATOR CO., LTD., Qingdao (CN); HAIER SMART HOME CO., LTD., Qingdao (CN)

(72) Inventors: Enpin Xia, Qingdao (CN); Hao Zhang, Qingdao (CN); Xiaobing Zhu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 187 days.

(21) Appl. No.: 17/629,404

(22) PCT Filed: Jan. 15, 2020

(86) PCT No.: PCT/CN2020/072256
§ 371 (c)(1),
(2) Date: Jan. 23, 2022

(87) PCT Pub. No.: WO2021/012656
PCT Pub. Date: Jan. 28, 2021

(65) Prior Publication Data

US 2022/0260303 A1 Aug. 18, 2022

(30) Foreign Application Priority Data

Jul. 23, 2019 (CN) ......................... 201910666787.8
Jul. 23, 2019 (CN) ......................... 201910667504.1

(51) Int. Cl.
*F25D 23/02* (2006.01)
*E05D 3/18* (2006.01)

(52) U.S. Cl.
CPC ............. *F25D 23/028* (2013.01); *E05D 3/18* (2013.01); *E05Y 2900/31* (2013.01); *F25D 2323/024* (2013.01)

(58) Field of Classification Search
CPC ... F25D 23/028; F25D 2323/024; E05D 3/18; E05D 7/0407; E05D 5/14; E05D 7/081; E05D 5/046; E05Y 2900/31
See application file for complete search history.

(56) References Cited

U.S. PATENT DOCUMENTS 1,075,130 A * 10/1913 Streberger ................ E05D 3/18 5/47
1,832,174 A * 11/1931 Zahner ...................... E05D 3/18 49/401

(Continued)

FOREIGN PATENT DOCUMENTS

CN 102373858 A 3/2012
CN 102425350 A 4/2012

(Continued)

*Primary Examiner* — Hiwot E Tefera
(74) *Attorney, Agent, or Firm* — Cheng-Ju Chiang

(57) ABSTRACT

The present invention discloses a hinge assembly with a decorative sheet and a refrigerator having the same. The hinge assembly includes a first hinge part, a second hinge part and the decorative sheet, wherein the first hinge part, the second hinge part and the decorative sheet are fitted with one another, the decorative sheet is provided between the first hinge part and the second hinge part, and the decorative sheet is detachably fitted with the first hinge part. The decorative sheet in the present invention may protect the first hinge part and facilitate replacement of the hinge assembly.

15 Claims, 18 Drawing Sheets

(56) References Cited

U.S. PATENT DOCUMENTS

| | | | | |
|---|---|---|---|---|
| 2,062,840 | A * | 12/1936 | Soss | E05D 3/147 16/370 |
| 2,793,387 | A * | 5/1957 | Odell | E05D 3/18 16/358 |
| 2,867,839 | A * | 1/1959 | Squire | E05D 3/18 16/358 |
| 3,065,498 | A * | 11/1962 | Johnson | E05D 1/04 16/359 |
| 3,083,403 | A * | 4/1963 | Van Noord | E05D 3/18 16/361 |
| 3,141,190 | A * | 7/1964 | Reiss | E05D 7/081 16/259 |
| 4,151,681 | A * | 5/1979 | Roberts | F25D 23/028 49/501 |
| 9,376,845 | B2 * | 6/2016 | Sawaguchi | E05D 3/18 |
| 9,380,863 | B2 * | 7/2016 | Sakanoue | B60N 3/004 |
| 10,876,333 | B2 * | 12/2020 | Zhang | F25D 23/028 |
| 2002/0104191 | A1 * | 8/2002 | Matteau | E05D 3/18 16/255 |
| 2003/0132689 | A1 * | 7/2003 | Shin | E05D 3/18 312/405 |
| 2004/0237257 | A1 * | 12/2004 | Pohl | F25D 23/028 16/221 |
| 2008/0301909 | A1 * | 12/2008 | Chien | G06F 1/1624 16/362 |
| 2010/0103601 | A1 * | 4/2010 | Wang | E05F 1/1215 16/362 |
| 2010/0125970 | A1 * | 5/2010 | Leimkuehler | E05D 11/0054 16/250 |
| 2012/0025686 | A1 * | 2/2012 | Darney | E05D 3/18 312/405 |
| 2013/0264930 | A1 * | 10/2013 | Kim | E05F 1/00 312/405 |
| 2016/0252291 | A1 * | 9/2016 | Kikuchi | F25D 23/028 312/405 |

FOREIGN PATENT DOCUMENTS

| | | | | | |
|---|---|---|---|---|---|
| CN | 102735014 | A | * | 10/2012 | |
| CN | 203274419 | U | | 11/2013 | |
| CN | 107288463 | A | * | 10/2017 | E05D 11/06 |
| CN | 207144689 | U | | 3/2018 | |
| CN | 109470008 | A | | 3/2019 | |
| JP | 02115680 | A | * | 4/1990 | |
| JP | H9-33162 | A | | 2/1997 | |
| JP | 2003121063 | A | * | 4/2003 | |
| JP | 2005146625 | A | * | 6/2005 | |
| JP | 2013256829 | A | * | 12/2013 | |
| KR | 20070111855 | A | * | 11/2007 | |

* cited by examiner

HINGE ASSEMBLY WITH DECORATIVE SHEET AND REFRIGERATOR HAVING THE SAME

The present application is a 35 U.S.C. § 371 National Phase conversion of International (PCT) Patent Application No. PCT/CN2020/072256, filed on Jan. 15, 2020, which claims priority to Chinese Patent Application No. 201910666787.8, entitled "Hinge Assembly with Decorative Sheet and Refrigerator Having the Same", filed on Jul. 23, 2019, and Chinese Patent Application No. 201910667504.1, entitled "Refrigerator with Decorative Sheet", filed on Jul. 23, 2019, the disclosures of which are incorporated herein by reference in their entirety. The PCT International Patent Application was filed and published in Chinese.

TECHNICAL FIELD

The present invention relates to the field of household appliance technologies, and in particular, to a hinge assembly with a decorative sheet and a refrigerator having the same.

BACKGROUND

Generally, a refrigerator is opened and closed by a hinge assembly, the hinge assembly is prone to wear in opening and closing processes of the refrigerator, and the existing hinge assembly of the refrigerator is difficult to disassemble, resulting in inconvenient replacement and maintenance.

SUMMARY

An object of the present invention is to provide a hinge assembly with a decorative sheet and a refrigerator having the same, which facilitate disassembly and replacement of the hinge assembly.

In order to achieve one of the above objects of the present invention, an embodiment of the present invention provides a hinge assembly with a decorative sheet, comprising a first hinge part, a second hinge part and the decorative sheet, the first hinge part, the second hinge part and the decorative sheet are fitted with one another, the decorative sheet is provided between the first hinge part and the second hinge part, and the decorative sheet is detachably fitted with the first hinge part.

As a further improvement of an embodiment of the present invention, the hinge assembly comprises a shaft and a groove fitted with each other, the shaft is provided on one of the first hinge part and the second hinge part, the groove is provided in the other of the first hinge part and the second hinge part, and the decorative sheet comprises a slot matched with the groove.

As a further improvement of an embodiment of the present invention, the first hinge part comprises a first hinge part body and the groove located at the first hinge part body, the groove comprises a protruding portion protruding from a surface of the first hinge part body, and the slot and the protruding portion are matched with each other.

As a further improvement of an embodiment of the present invention, the grooves comprise a first groove and a second groove, the shafts comprise a first shaft and a second shaft, the first shaft is fitted with the first groove, the second shaft is fitted with the second groove, the first shaft is located in one of the first hinge part and the second hinge part, the first groove is located in the other of the first hinge part and the second hinge part, the second shaft is located in one of the first hinge part and the second hinge part, and the second groove is located in the other of the first hinge part and the second hinge part.

As a further improvement of an embodiment of the present invention, the first groove and the second groove are located at the first hinge part, and the first shaft and the second shaft are located at the second hinge part.

As a further improvement of an embodiment of the present invention, the first hinge part is configured as a plastic part, and the decorative sheet is configured as a metal part.

As a further improvement of an embodiment of the present invention, the decorative sheet comprises a hook, and the hook is fitted with a side edge of the first hinge part.

In order to achieve one of the above objects of the present invention, an embodiment of the present invention provides a refrigerator, comprising a cabinet, a door and the hinge assembly with a decorative sheet according to any one of the above technical solutions, the first hinge part is connected with the door, the second hinge part is connected with the cabinet, the door further comprises a door trim, and the door trim has a mounting groove for accommodating the first hinge part.

As a further improvement of an embodiment of the present invention, the first hinge part comprises a first mounting fixing hole and a first combining fixing hole, the mounting groove comprises a second mounting fixing hole and a second combining fixing hole, the decorative sheet comprises a third combining fixing hole, the first mounting fixing hole and the second mounting fixing hole are locked by a mounting screw, and the first combining fixing hole, the second combining fixing hole, and the third combining fixing hole are locked by a combining screw.

As a further improvement of an embodiment of the present invention, the decorative sheet comprises a covering portion, and the covering portion shields the first mounting fixing hole and the mounting screw.

In order to achieve one of the above objects of the present invention, an embodiment of the present invention provides a refrigerator, comprising a cabinet, a door for opening and closing the cabinet, and a hinge assembly for connecting the cabinet and the door, the hinge assembly is the hinge assembly according to any one of the above technical solutions, and the cabinet comprises an accommodating chamber and a pivoting side connected with the hinge assembly; when the door is opened, the hinge assembly drives the door to move from the pivoting side to the accommodating chamber.

As a further improvement of an embodiment of the present invention, the hinge assembly comprises shafts and grooves fitted with each other, the grooves comprise a first groove and a second groove, the shafts comprise a first shaft and a second shaft, the first groove comprises an initial position and a first stop position, and the second groove comprises a first end and a second end opposite to each other; when the door is in a closed state, the first shaft is located at the initial position, and the second shaft is located at the first end, and when the door is opened, the second shaft moves in the second groove to drive the first shaft to move from the initial position to the first stop position.

As a further improvement of an embodiment of the present invention, the second groove comprises a first section and a second section connected between the first end and the second end; when the door is opened from the closed state to a first opening angle, the first shaft is kept at the initial position, and the second shaft moves in the first section around the first shaft, and when the door is continuously opened from the first opening angle to a second opening angle, the second shaft moves in the second section to drive the first shaft to move from the initial position to the first stop position.

As a further improvement of an embodiment of the present invention, the door is provided with a first fitting portion, the cabinet is provided with a second fitting portion, the first fitting portion and the second fitting portion are engaged with each other when the door is in the closed state, and when the door is opened from the closed state to the first opening angle, the second shaft moves in the first section around the first shaft to drive the first fitting portion to be disengaged from the second fitting portion.

As a further improvement of an embodiment of the present invention, the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the door is in the closed state, the vertical beam extends to the second door; when the door is opened from the closed state to the first opening angle, the vertical beam rotates towards a side close to the accommodating chamber, such that a first folding angle is formed between the first door and the vertical beam, and when the door is continuously opened from the first opening angle to the second opening angle, the vertical beam and the first door are kept relatively static.

As a further improvement of an embodiment of the present invention, the first groove further comprises a second stop position located on a side of the initial position apart from the first stop position, and the second groove further comprises a third section and a fourth section located between the second section and the second end; when the door is continuously opened from the second opening angle to a third opening angle, the second shaft moves in the third section to drive the first shaft to move from the first stop position to the second stop position, and when the door is continuously opened from the third opening angle to a maximum opening angle, the first shaft is kept at the second stop position, and the second shaft moves in the fourth section around the first shaft.

Compared with a prior art, the present invention has the following beneficial effects: the decorative sheet in an embodiment of the present invention may protect a first hinge part and facilitate replacement of the hinge assembly.

DETAILED DESCRIPTION

Figure 1:
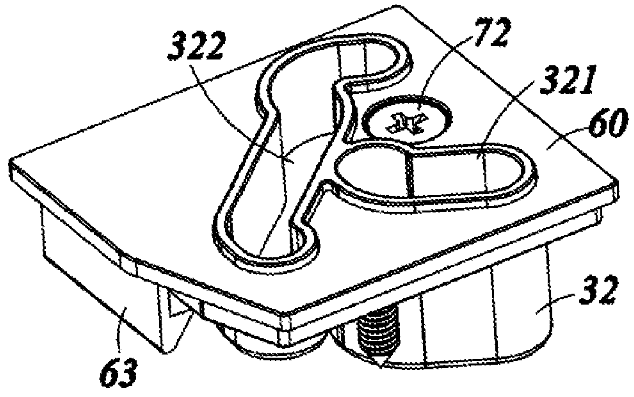
FIG. 1 is a perspective view of a hinge assembly (not including a second hinge part) according to an embodiment of the present invention.

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", "lower", "below", "left", "right", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein.

Figure 2:
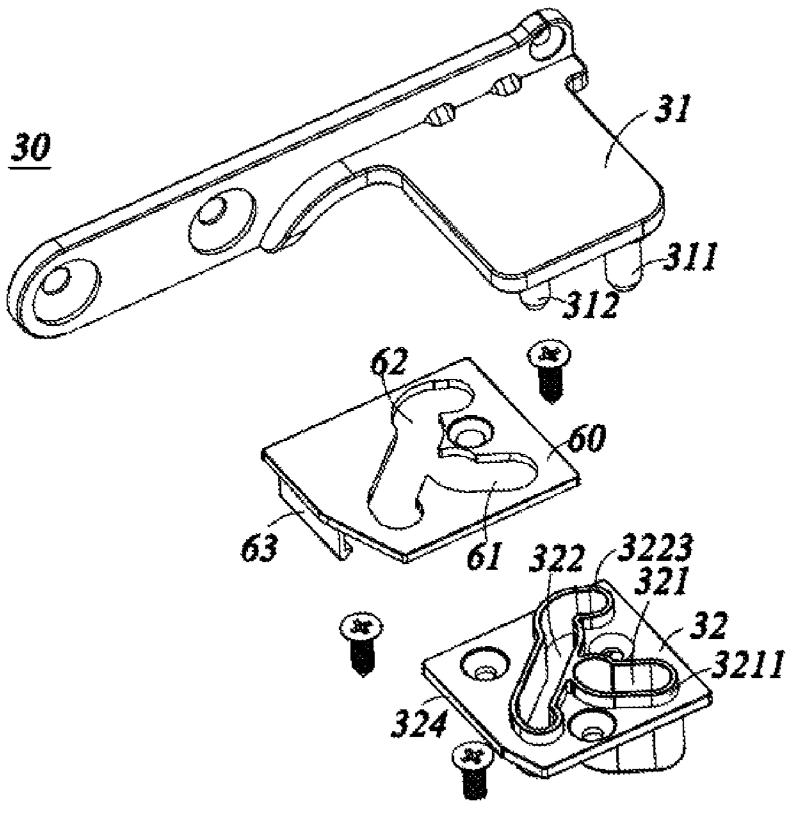
FIG. 2 is an exploded view of a hinge assembly according to an embodiment of the present invention.
Figure 3:
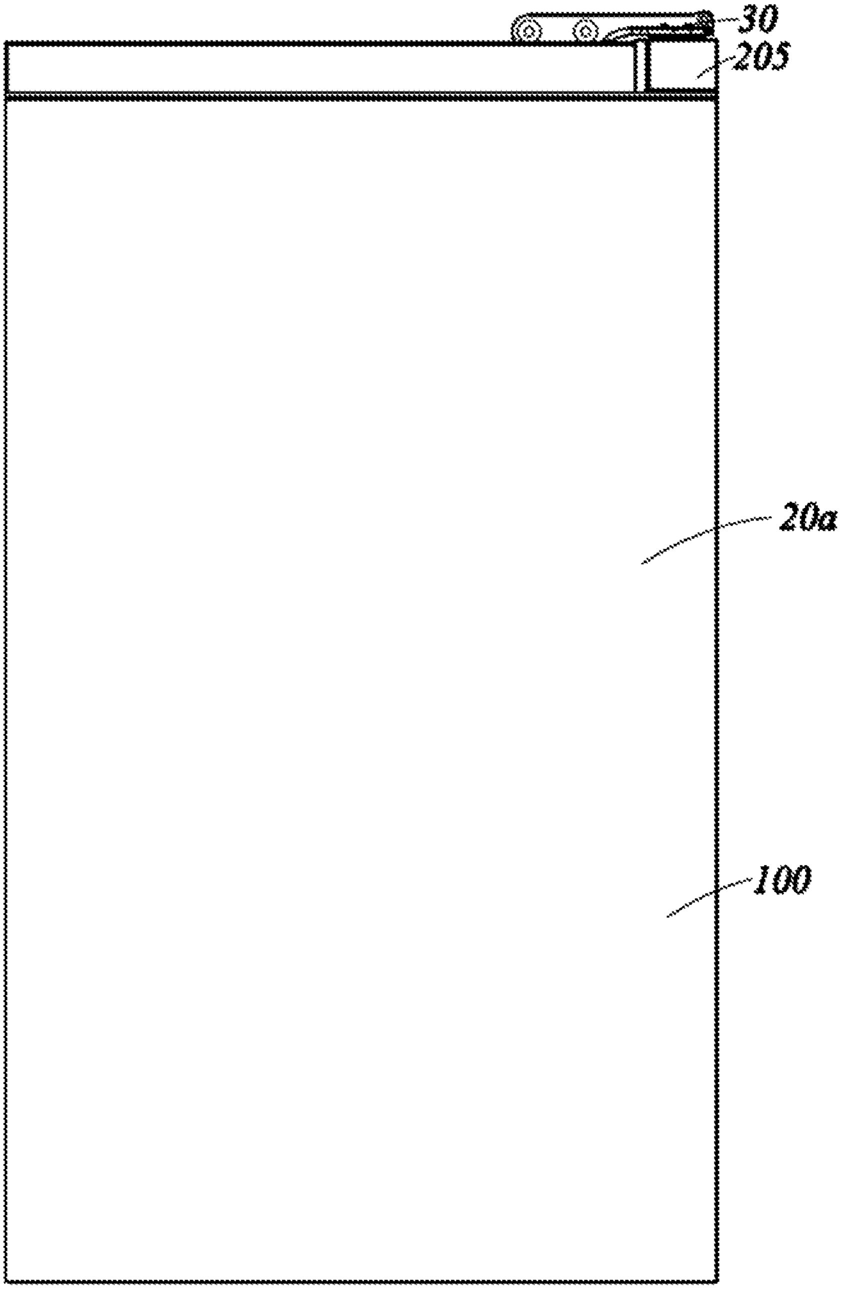
FIG. 3 is a schematic diagram of a partial structure of a refrigerator according to an embodiment of the present invention.

FIGS. 1 to 3 are schematic diagrams of a hinge assembly 30 with a decorative sheet 60 according to an embodiment of the present invention.

The hinge assembly 30 includes a first hinge part 32, a second hinge part 31, and a decorative sheet 60, which are fitted with one another.

The decorative sheet 60 is provided between the first hinge part 32 and the second hinge part 31, and the decorative sheet 60 is detachably fitted with the first hinge part 32.

As such, the decorative sheet 60 may protect the first hinge part 32 and facilitate replacement of the hinge assembly 30.

In the present embodiment, the hinge assembly 30 includes shafts 311, 312 and grooves 321, 322, which are fitted with each other, the shafts 311, 312 are provided on one of the first hinge part 32 and the second hinge part 31, the grooves 321, 322 are provided in the other of the first hinge part 32 and the second hinge part 31, and the decorative sheet 60 includes slots 61, 62 matched with the grooves 321, 322.

Specifically, the grooves 321, 322 include a first groove 321 and a second groove 322, the shafts 311, 312 include a first shaft 311 and a second shaft 312, the first shaft 311 is fitted with the first groove 321, the second shaft 312 is fitted with the second groove 322, the first shaft 311 is located in one of the first hinge part 32 and the second hinge part 31, the first groove 321 is located in the other of the first hinge part 32 and the second hinge part 31, the second shaft 312 is located in one of the first hinge part 32 and the second hinge part 31, and the second groove 322 is located in the other of the first hinge part 32 and the second hinge part 31.

Here, for example, the first groove 321 and the second groove 322 are located in the first hinge part 32, and the first shaft 311 and the second shaft 312 are located on the second hinge part 31.

The decorative sheet 60 includes a first slot 61 and a second slot 62 matched with the first groove 321 and the second groove 322, the first shaft 311 penetrates through the first slot 61 to be movably provided in the first groove 321, and the second shaft 312 penetrates through the second slot 62 to be movably provided in the second groove 322.

The first hinge part 32 includes a first hinge part body 323, as well as the first groove 321 and the second groove 322 located on the first hinge part body 323, the first groove 321 and the second groove 322 include a first protruding portion 3211 and a second protruding portion 3223 protruding from a surface of the first hinge part body 323 respectively, the first slot 61 is matched with the first protruding portion 3211, and the second slot 62 is matched with the second protruding portion 3223.

Here, the first protruding portion 3211 is connected with the second protruding portion 3223, and the first slot 61 and the second slot 62 are communicated with each other.

On the one hand, the arrangement of the first protruding portion 3211 and the second protruding portion 3223 may facilitate a mounting operation of the decorative sheet 60, and limit the decorative sheet 60, and on the other hand, when the decorative sheet 60 and the first hinge part 32 are assembled to each other, the first protruding portion 3211 and the second protruding portion 3223 protrude from the decorative sheet 60, which may reduce a contact area between the second hinge part 31 and the first hinge part 32, thus avoiding blockage of relative movement between the second hinge part 31 and the first hinge part 32.

In the present embodiment, the first hinge part 32 is configured as a plastic part, the decorative sheet 60 is configured as a metal part, and specifically, the decorative sheet 60 is configured as a drawn aluminum alloy decorative sheet, which facilitates control over an appearance and a color.

The decorative sheet 60 has a shape matched with a shape of the first hinge part body 323; that is, the decorative sheet 60 may completely cover the first hinge part body 323.

The decorative sheet 60 includes a hook 63, and the hook 63 is fitted with a side edge 324 of the first hinge part 32.

Specifically, an edge of the decorative sheet 60 is provided with a hook 63 protruding towards the first hinge part 32, and when the decorative sheet 60 and the first hinge part 32 are assembled to each other, the hook 63 is just tightly clamped to the side edge 324 of the first hinge part 32.

Figure 4:
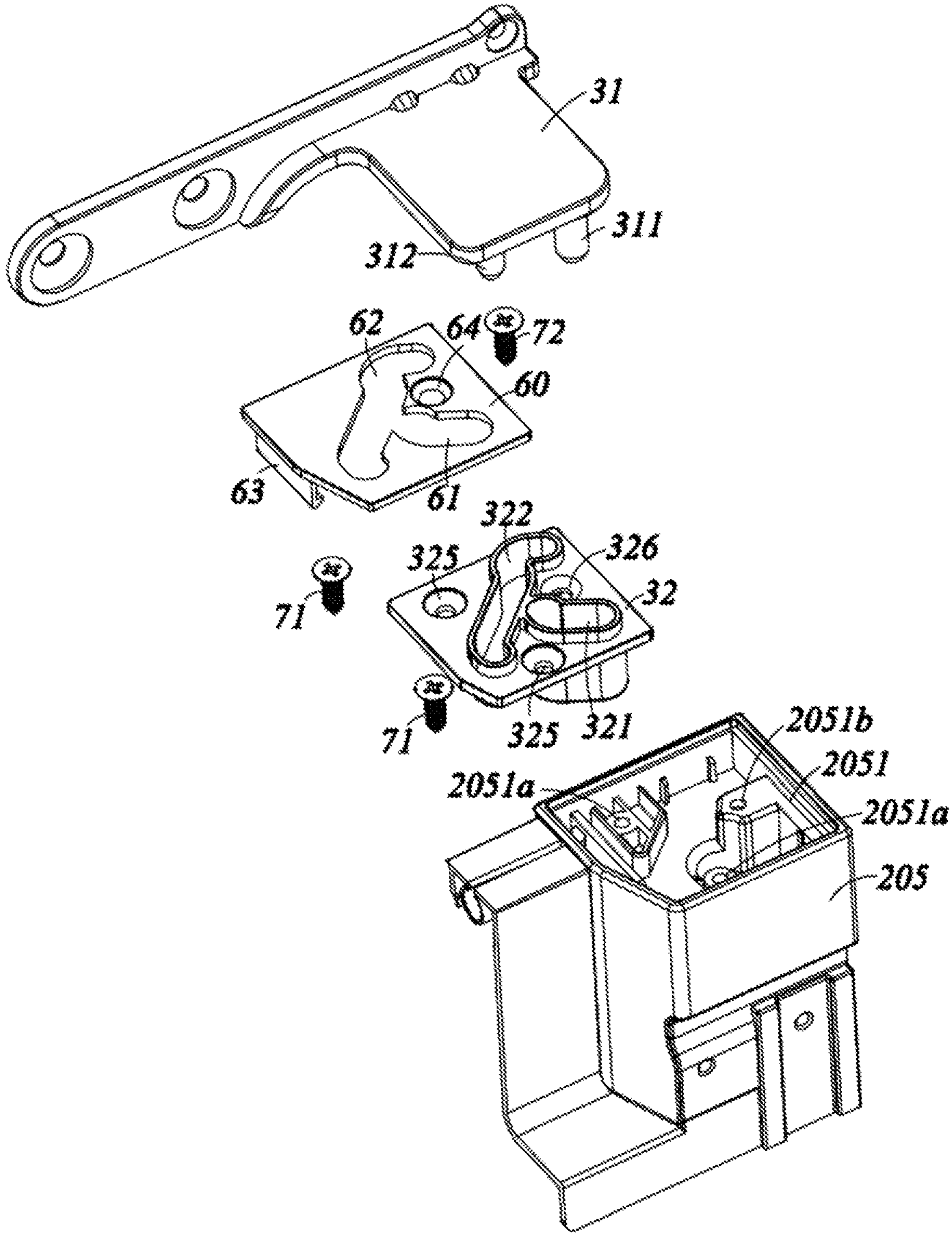
FIG. 4 is an exploded view of a partial structure of a refrigerator according to an embodiment of the present invention.
Figure 5:
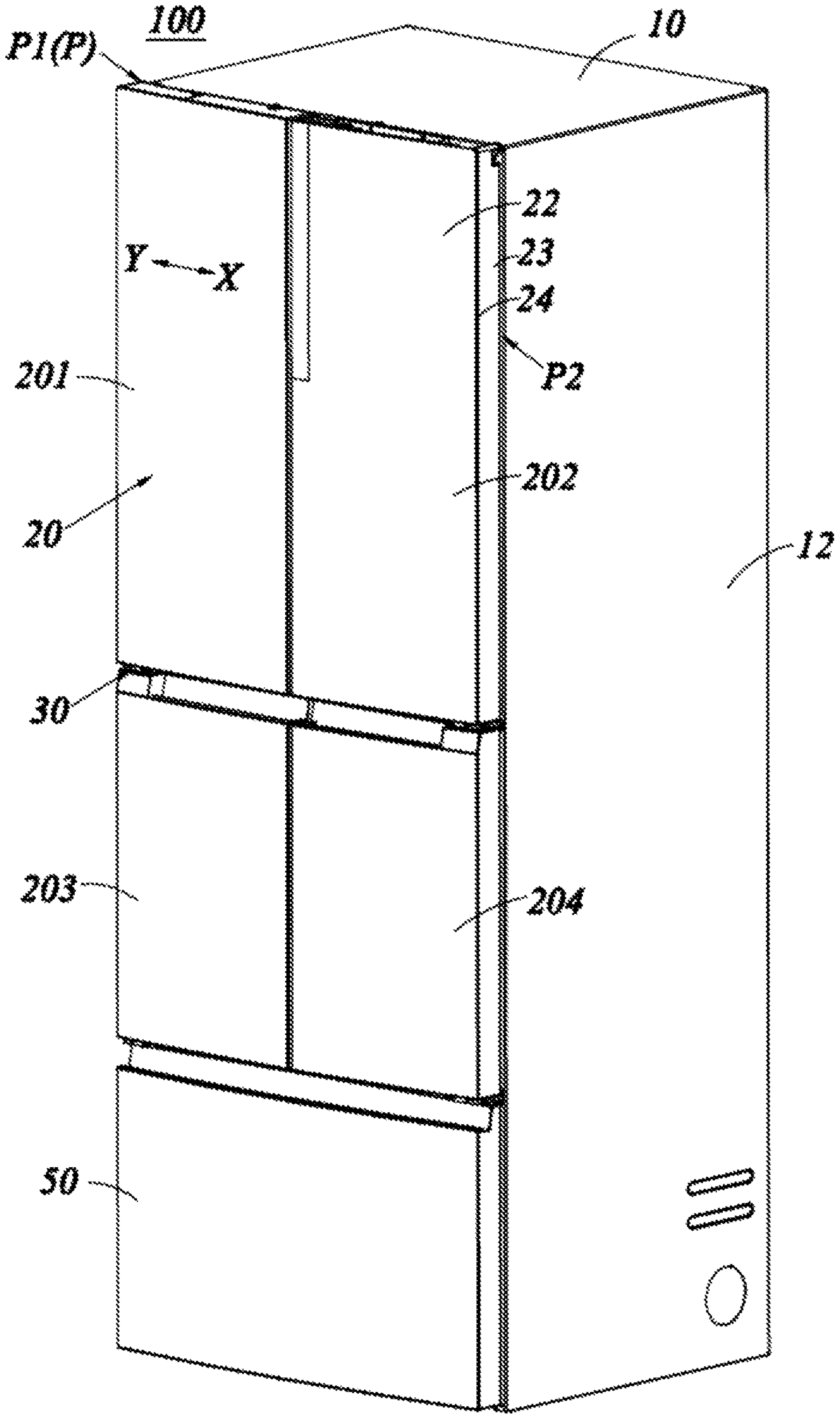
FIG. 5 is a perspective view of a refrigerator according to an embodiment of the present invention.

Referring to FIG. 4, an embodiment of the present invention further provides a refrigerator 100 which includes a cabinet 10, a door 20, and a hinge assembly 30 with a decorative sheet 60, a first hinge part 32 is connected with the door 20, and a second hinge part 31 is connected with the cabinet 10.

The door 20 includes a door body **20*a*, and a door trim 205 provided above or below the door body 20*a*, and the door trim 205 has a mounting groove 2051 for accommodating the first hinge part 32**.

The first hinge part 32 includes a first mounting fixing hole 325 and a first combining fixing hole 326; here, for example, the first hinge part 32 includes two first mounting fixing holes 325 and one first combining fixing hole 326, and the first mounting fixing hole 325 and the first combining fixing hole 326 are located in peripheral regions of a first groove 321 and a second groove 322.

The mounting groove 2051 includes a second mounting fixing hole **2051*a* and a second combining fixing hole 2051*b*, and here, for example, the mounting groove 2051 includes two second mounting fixing holes 2051*a* and one second combining fixing hole 205*b***.

The decorative sheet 60 includes a third combining fixing hole 64.

The first mounting fixing hole 325 and the second mounting fixing hole **2051*a* are locked by a mounting screw 71**.

The first combining fixing hole 326, the second combining fixing hole **2051*b*, and the third combining fixing hole 64 are locked by a combining screw 72**.

The decorative sheet 60 includes a covering portion 65, and the covering portion 65 shields the first mounting fixing hole 325 and the mounting screw 71.

Here, the decorative sheet 60, the first hinge part 32 and the mounting groove 2051 are fixed by the mounting screw

71, the combining screw 72 and the hook 63, thus facilitating disassembly, maintenance, or replacement, or the like, of the first hinge part 32 and the decorative sheet 60; moreover, the covering portion 65 of the decorative sheet 60 shields the first mounting fixing hole 325 and the mounting screw 71, thereby improving overall attractiveness.

In addition, the decorative sheet 60 is exposed outside the refrigerator 100, especially in a process of opening the door 20; the decorative sheet 60 in the present embodiment is configured as a metal part, which facilitates the control over the color of the decorative sheet 60, such that the decorative sheet 60 and the refrigerator 100 may keep a same color as a whole, thus greatly improving attractiveness.

Referring to FIGS. 5 to 10, an embodiment of the present invention further provides a refrigerator 100 with a decorative sheet 60.

The refrigerator 100 includes a cabinet 10, a door 20 for opening and closing the cabinet 10, and a hinge assembly 30 for connecting the cabinet 10 and the door 20.

The cabinet 10 includes an accommodating chamber S and a pivoting side P connected with the hinge assembly 30.

Here, the "pivoting side P" is defined as a region where the door 20 is rotated relative to the cabinet 10, i.e., a region where the hinge assembly 30 is provided, a direction from the pivoting side P to the accommodating chamber S is defined as a first direction X, and a direction from the accommodating chamber S to the pivoting side P is defined as a second direction Y.

Specifically, when the hinge assemblies 30 are provided on both left and right sides of the refrigerator 100, the cabinet 10 includes a left pivoting side P1 and a right pivoting side P2; when the left pivoting side P1 serves as the pivoting side P, the first direction X is from left to right, and the second direction Y is from right to left, and when the right pivoting side P2 serves as the pivoting side P, the first direction X is from right to left, and the second direction Y is from left to right; that is, actual directions of the first direction X and the second direction Y are different corresponding to different pivoting sides P, and for example, the left pivoting side P1 serves as the pivoting side P in the following description.

The hinge assembly 30 includes a first hinge part 32 and a second hinge part 31 which are fitted with each other, and a decorative sheet 60.

The decorative sheet 60 is provided between the first hinge part 32 and the second hinge part 31, and the decorative sheet 60 is detachably fitted with the first hinge part 32.

In an opening process of the door 20, the second shaft 312 moves in the second groove 322 to drive the door 20 to move from the pivoting side P towards the accommodating chamber S.

Here, in the opening process of the door 20, the door 20 moves towards a side of the accommodating chamber S; that is, at this point, the door 20 rotates relative to the cabinet 10 and is displaced relative to the cabinet 10 in the first direction X, thus greatly reducing a distance by which the door 20 protrudes out of the cabinet 10 towards a side apart from the accommodating chamber S in the rotation process; that is, the displacement of the door 20 in the first direction X counteracts a part of the door 20 protruding out of the cabinet 10 in the second direction Y in the rotation process, thereby preventing the door 20 from interfering with a peripheral cupboard or wall, or the like, in the opening process; the refrigerator is suitable for an embedded cupboard or a scenario with a small space for accommodating the refrigerator 100.

Moreover, the decorative sheet 60 may protect the first hinge part 32 and facilitate replacement of the hinge assembly 30.

For other descriptions of the decorative sheet 60, reference may be made to the description of the previously described hinge assembly 30, which is not repeated herein.

Figure 7:
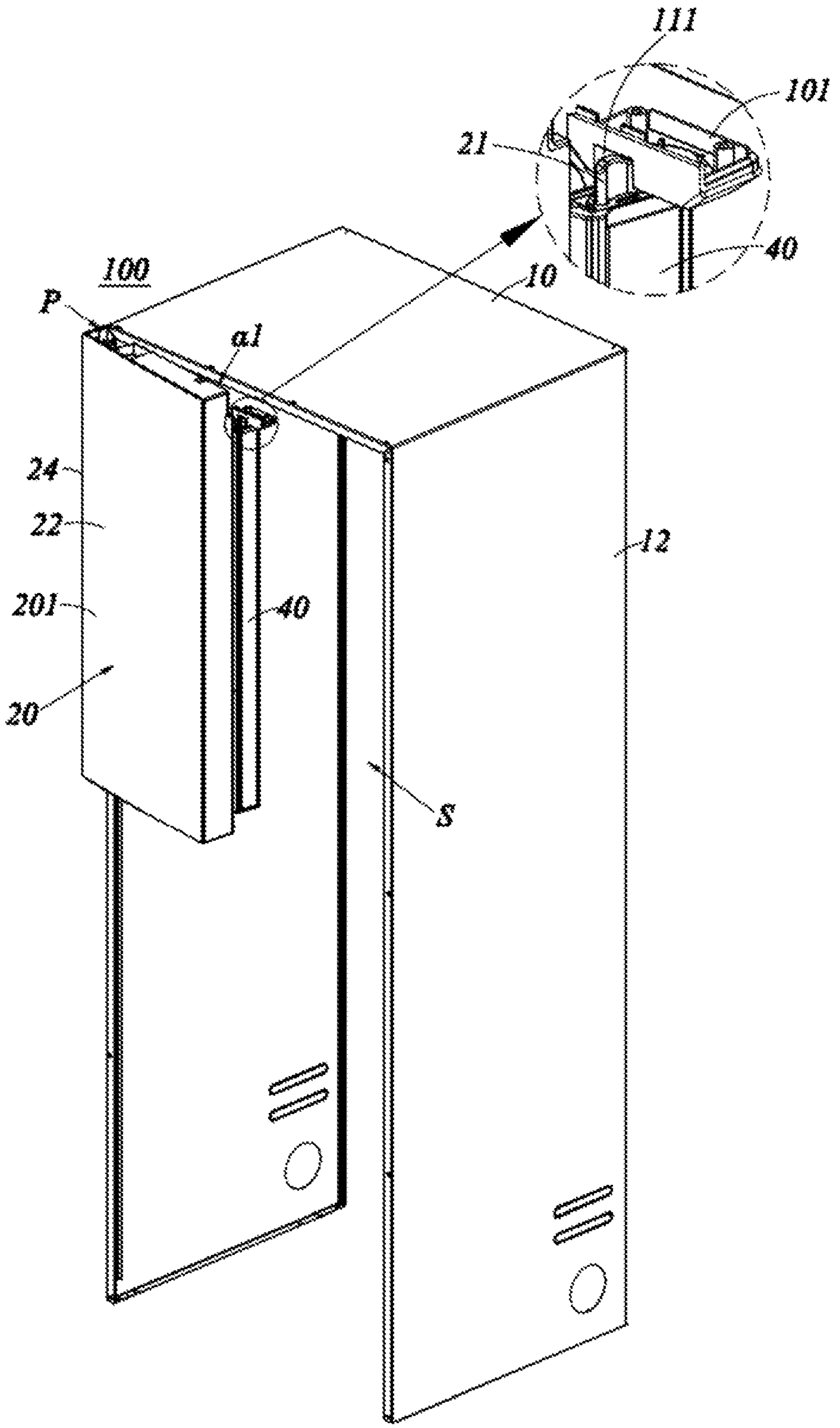
FIG. 7 is a schematic diagram in which a refrigerator is opened to a first opening angle according to an embodiment of the present invention.

In the present embodiment, referring to FIG. 7, when the door 20 is opened to a first opening angle α1 from a closed state, the hinge assembly 30 drives the door 20 to rotate in situ relative to the cabinet 10.

Here, when opened to the first opening angle α1 from the closed state, the door 20 rotates in situ relative to the cabinet 10; that is, the door 20 only rotates without generating displacement in other directions, thus effectively avoiding that the door 20 is unable to be normally opened due to displacement in a certain direction of the door 20; specific reference may be made to descriptions of the following specific examples.

Figure 8:
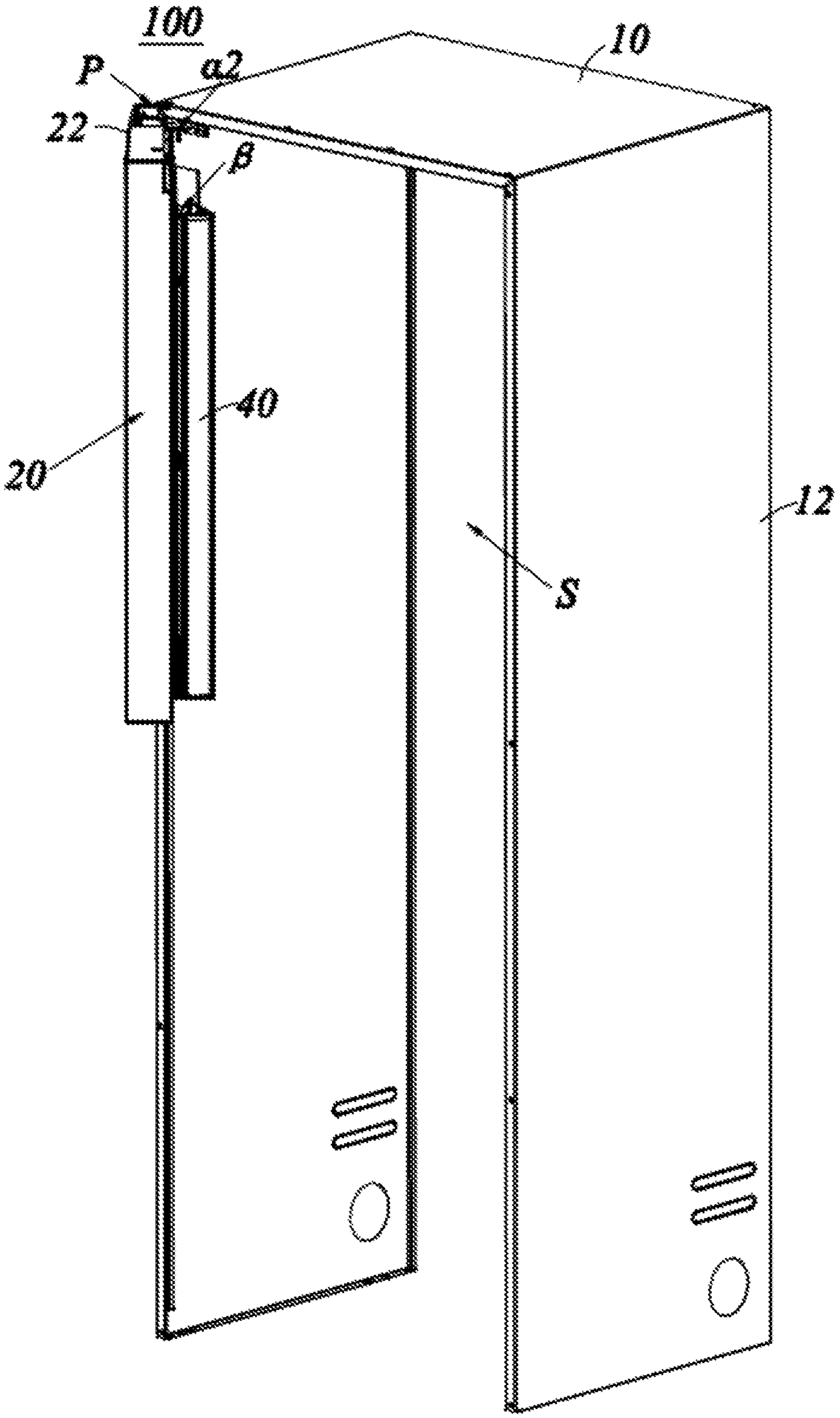
FIG. 8 is a schematic diagram in which a refrigerator is opened to a second opening angle according to an embodiment of the present invention.

Referring to FIG. 8, when the door 20 is continuously opened to a second opening angle α2 from the first opening angle α1, the hinge assembly 30 drives the door 20 to move from the pivoting side P towards the accommodating chamber S.

Here, when the door 20 is continuously opened to the second opening angle α2 from the first opening angle α1, the door 20 moves towards the side of the accommodating chamber S; that is, at this point, the door 20 rotates relative to the cabinet 10 and is displaced relative to the cabinet 10 in the first direction X, thus greatly reducing the distance by which the door 20 protrudes out of the cabinet 10 towards the side apart from the accommodating chamber S in the rotation process; that is, the displacement of the door 20 in the first direction X counteracts the part of the door 20 protruding out of the cabinet 10 in the second direction Y in the rotation process, thereby preventing the door 20 from interfering with the peripheral cupboard or wall, or the like, in the opening process; the refrigerator is suitable for the embedded cupboard or the scenario with a small space for accommodating the refrigerator 100.

Figure 9:
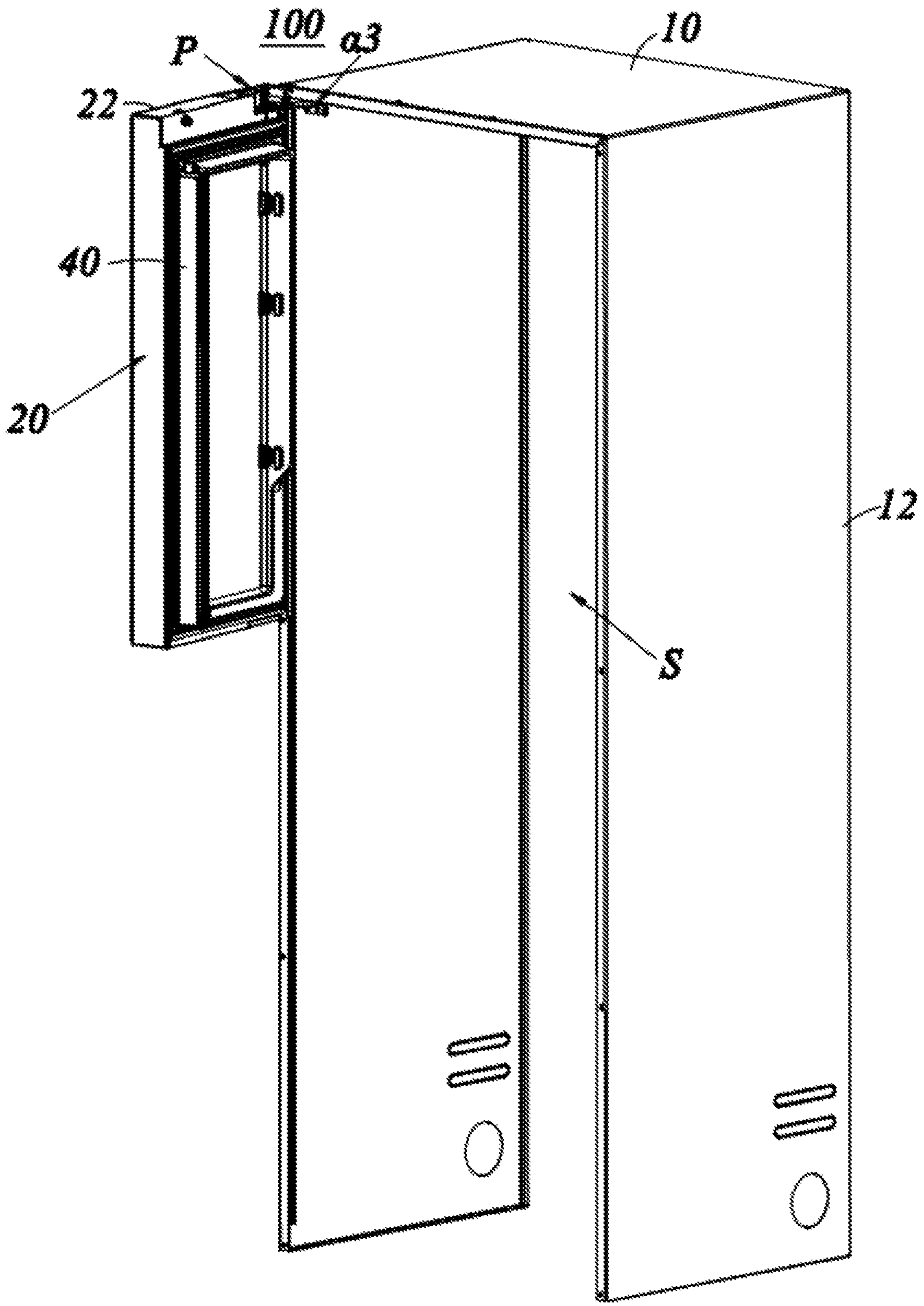
FIG. 9 is a schematic diagram in which a refrigerator is opened to a third opening angle according to an embodiment of the present invention.

Referring to FIG. 9, when the door 20 is continuously opened to a third opening angle α3 from the second opening angle α2, the hinge assembly 30 drives the door 20 to move from the accommodating chamber S towards the pivoting side P.

Here, when continuously opened to the third opening angle α3 from the second opening angle α2, the door 20 moves towards a side of the pivoting side P; that is, at this point, the door 20 rotates relative to the cabinet 10 and is displaced in the second direction Y relative to the cabinet 10, such that the door 20 may be as far away from the cabinet 10 as possible, thus guaranteeing an opening degree of the cabinet 10, and avoiding a problem that drawers, racks, or the like, in the cabinet 10 are unable to be opened due to interference of the door 20.

Figure 10:
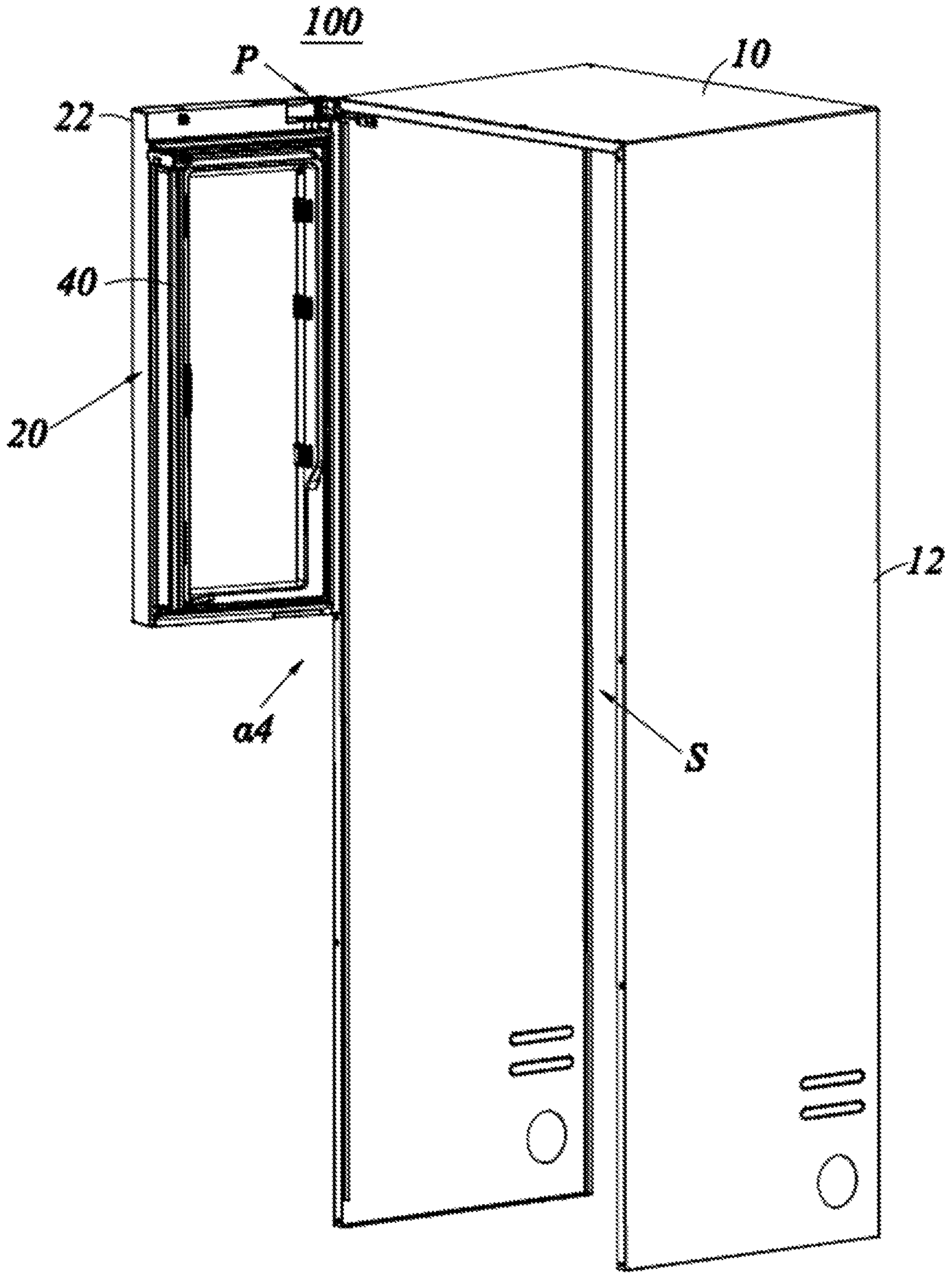
FIG. 10 is a schematic diagram in which a refrigerator is opened to a maximum opening angle according to an embodiment of the present invention.

Referring to FIG. 10, when the door 20 is continuously opened to a maximum opening angle α4 from the third opening angle α3, the hinge assembly 30 drives the door 20 to rotate in situ relative to the cabinet 10.

With continued reference to FIGS. 5 to 10, in a specific example of the present invention, the door 20 is provided with a first fitting portion 21, and the cabinet 10 is provided with a second fitting portion 11.

Figure 6:
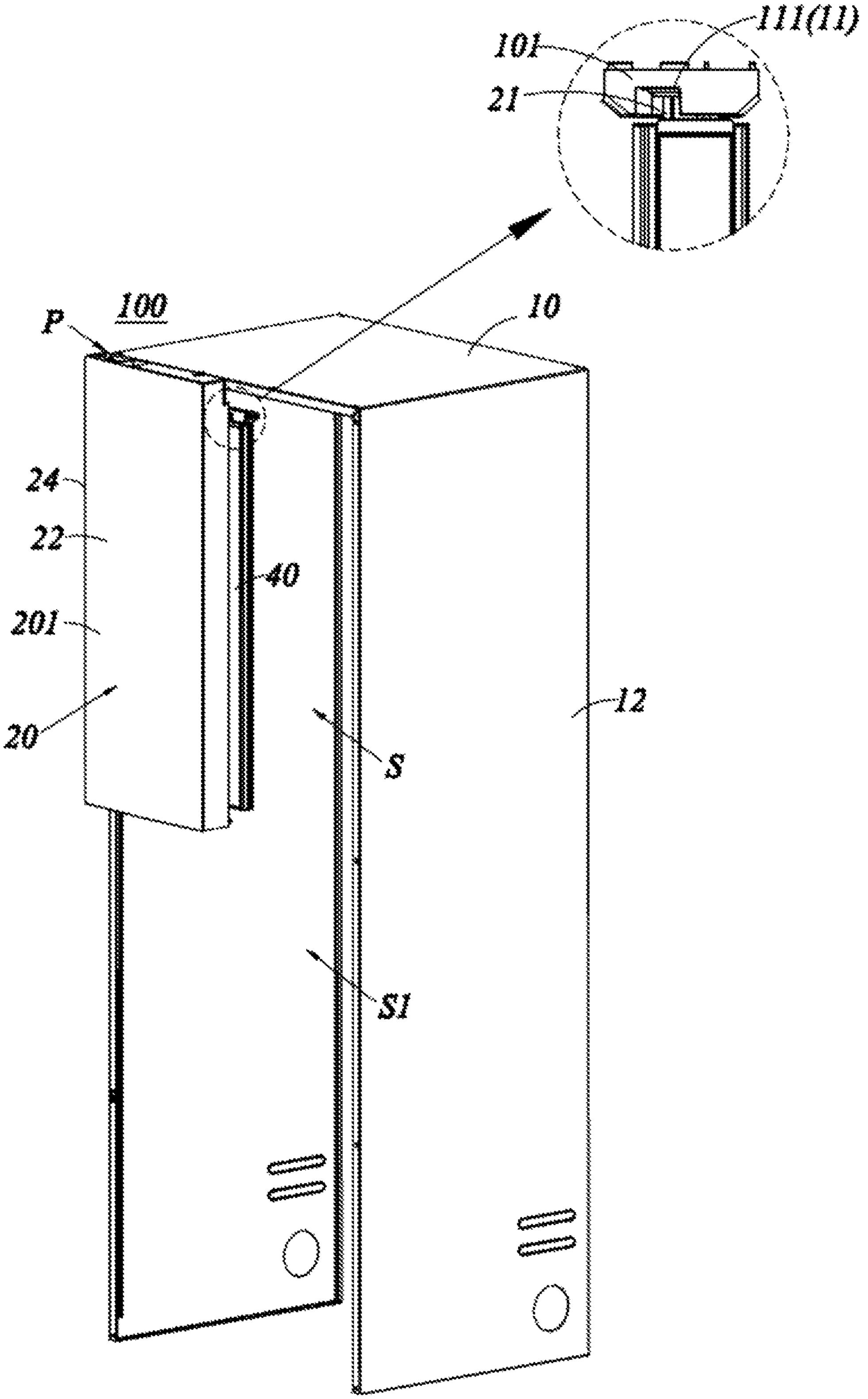
FIG. 6 is a schematic diagram in which a refrigerator is in a closed state according to an embodiment of the present invention.

Referring to FIG. 6, when the door 20 is in the closed state, the first fitting portion 21 and the second fitting portion 11 are engaged with each other.

Here, the first fitting portion 21 and the second fitting portion 11 are engaged with each other to close the door 20 and the cabinet 10, and specific forms of the first fitting portion 21 and the second fitting portion 11 may be determined according to actual situations.

Referring to FIG. 7, when the door 20 is opened to the first opening angle $\alpha$1 from the closed state, the hinge assembly 30 drives the door 20 to rotate in situ relative to the cabinet 10, so as to drive the first fitting portion 21 to be disengaged from the second fitting portion 11.

Here, when opened to the first opening angle $\alpha$1 from the closed state, the door 20 rotates in situ relative to the cabinet 10; that is, the door 20 only rotates without generating displacement in other directions, thus effectively avoiding that the first fitting portion 21 is unable to be disengaged from the second fitting portion 11 due to the displacement in a certain direction of the door 20.

It should be noted that the refrigerator 100 in this example may be a single-door refrigerator having the first fitting portion 21 and the second fitting portion 11, or a side-by-side refrigerator, a multi-door refrigerator, or the like, having the first fitting portion 21 and the second fitting portion 11.

Figure 11:
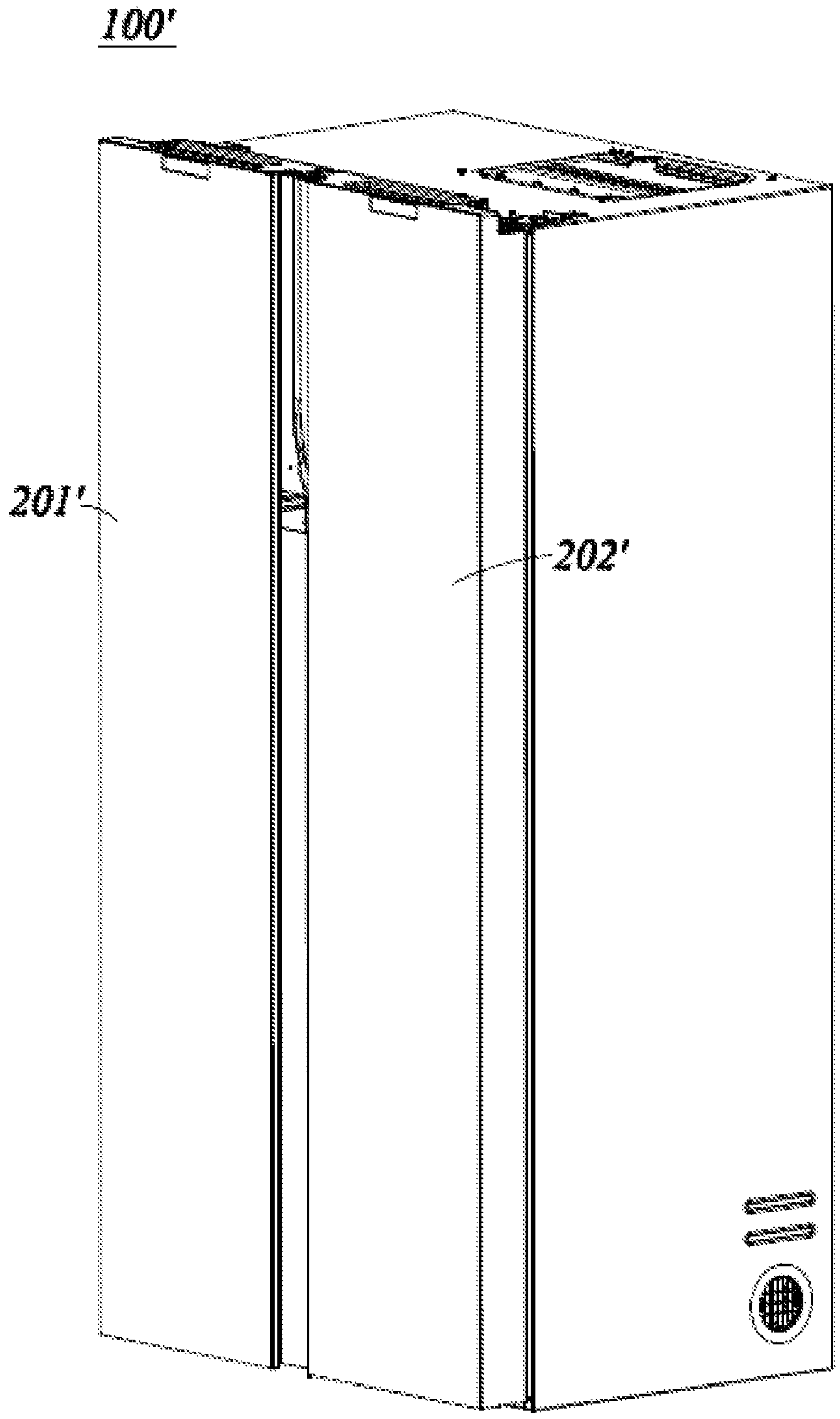
FIG. 11 is an overall schematic diagram of a refrigerator in another specific example of the present invention.
Figure 12:
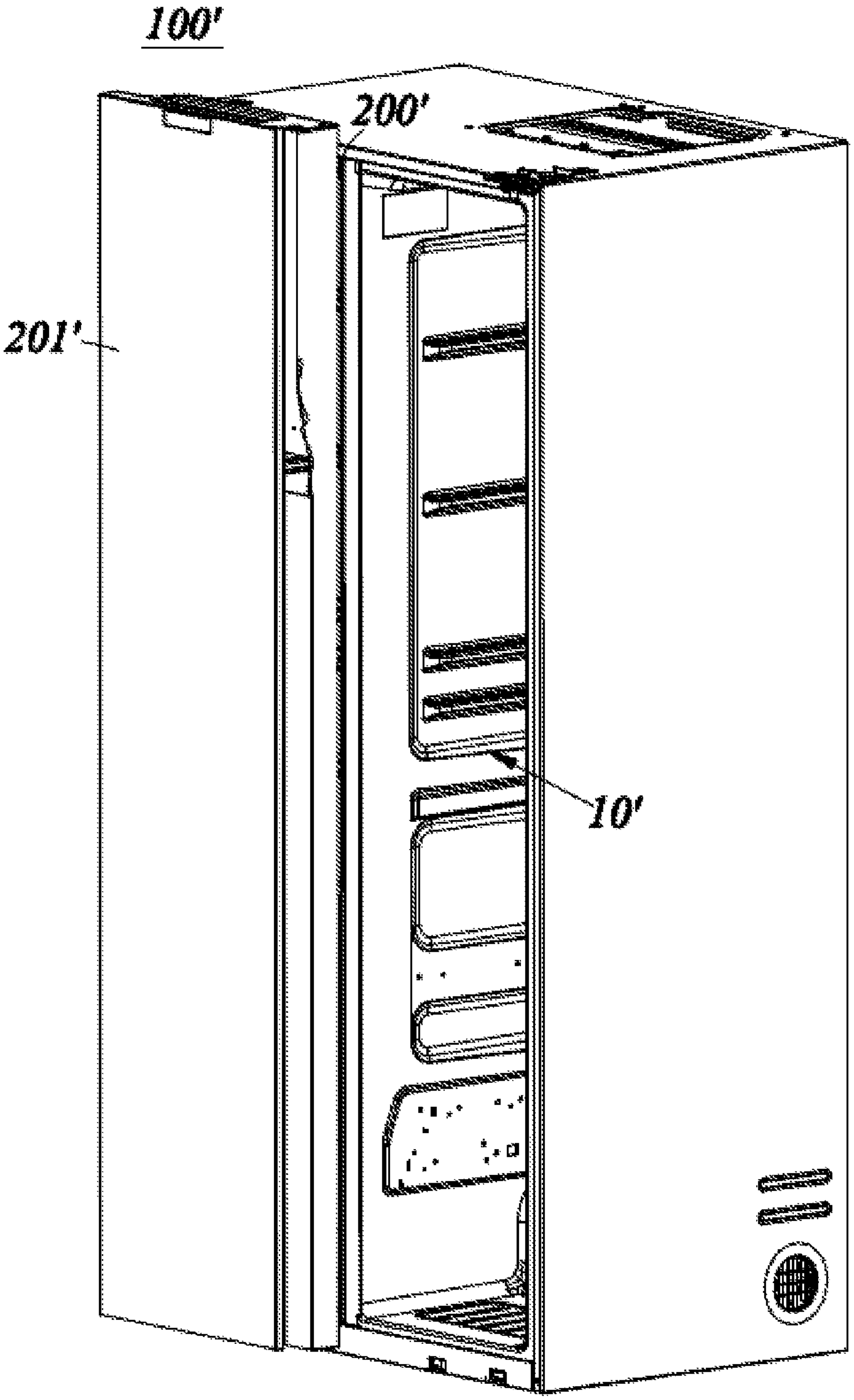
FIG. 12 is a schematic diagram of a refrigerator in another specific example of the present invention with a part omitted.

In other specific examples, the refrigerator 100 may not include the first fitting portion 21 and the second fitting portion 11; with reference to FIGS. 11 and 12, the refrigerator 100 is configured as a side-by-side refrigerator 100', the refrigerator 100' includes two compartments distributed at intervals, and the two compartments are spaced apart from each other by a fixed beam 200'; the refrigerator 100' further includes a first door 201' and a second door 202' corresponding to the two compartments respectively, and the first door 201' and the second door 202' are provided adjacent to each other; when the refrigerator 100' is in a closed state, both the first door 201' and the second door 202' contact the fixed beam 200' to achieve a sealing effect, and when the first door 201' and/or the second door 202' are/is opened from the closed state to the first opening angle $\alpha$1, the first door 201' and/or the second door 202' rotate(s) in situ relative to the cabinet 10'.

Here, when the first door 201' is displaced horizontally when opened, the first door 201' and the second door 202' are unable to be opened normally due to interference therebetween, but the first door 201' and the second door 202' rotate in situ when the refrigerator 100' in this example is opened, thus effectively avoiding the interference between the adjacent first and second doors 201', 202'.

Certainly, the type of the refrigerator 100 is not limited to the above-mentioned specific examples, and may be determined according to actual situations.

Figure 13:
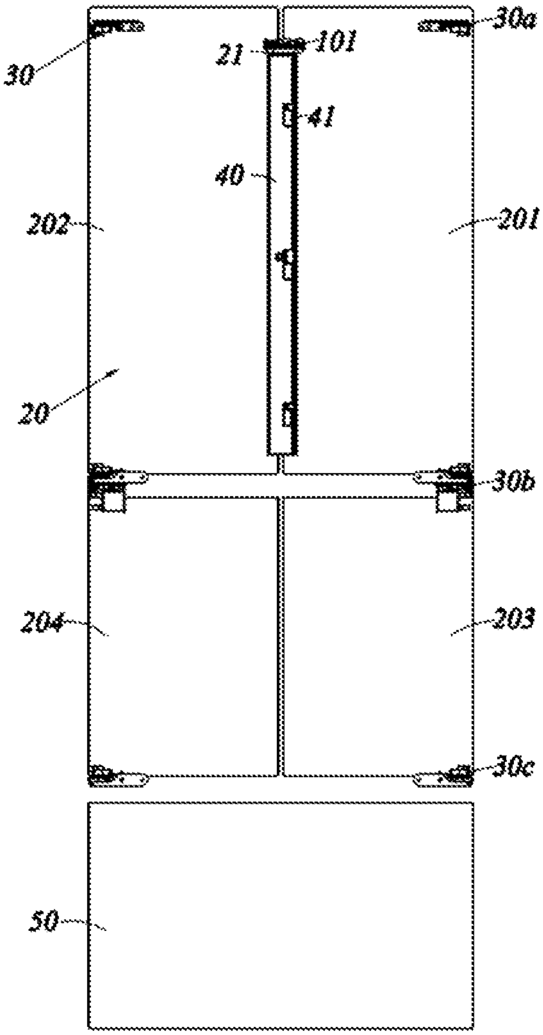
FIG. 13 is a rear view of a refrigerator according to an embodiment of the present invention (with partial elements omitted)
Figure 14:
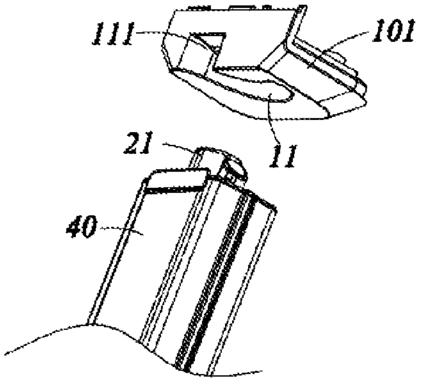
FIG. 14 is an exploded view of a first fitting portion and a second fitting portion according to an embodiment of the present invention.

Referring to FIGS. 13 and 14, the door 20 includes a first door 201 and a second door 202 pivotally connected with the cabinet 10 and arranged side by side in a horizontal direction.

The refrigerator 100 further includes a vertical beam 40 movably connected to a side of the first door 201 close to the second door 202, and the first fitting portion 21 is provided at the vertical beam 40.

Here, the vertical beam 40 is movably connected to a right side of the first door 201, the vertical beam 40 and the first door 201 may be connected by a return spring 41, and the vertical beam 40 rotates relative to the first door 201 around an axis in a vertical direction; in other words, under the action of the return spring 41, the vertical beam 40 may rotate relative to the first door 201 and be kept at a predetermined position.

The first fitting portion 21 is configured as a bump 21 protruding upwards from the vertical beam 40.

The second fitting portion 11 is fixedly provided on the cabinet 10; for example, the second fitting portion 11 is configured as a groove 11 in a base 101, the base 101 is fixedly provided at a top of the accommodating chamber S, a notch 111 is provided in an end of the groove 11, the notch 111 has a forward opening, the bump 21 and the groove 11 are both arc-shaped, and the bump 21 enters or leaves the groove 11 through the notch 111 to achieve mutual limitation and separation of the bump 21 and the groove 11.

Certainly, it may be understood that specific structures of the first and second fitting portions 21, 11 are not limited to the above description; that is, the first fitting portion 21 is not limited to the bump 21 at the vertical beam 40, the second fitting portion 11 is not limited to the groove 11 fitted with the bump 21, and the first and second fitting portions 21, 11 may be configured as structures fitted with each other in other regions of the refrigerator 100.

In the present embodiment, the door 20 further includes a third door 203 and a fourth door 204 pivotally connected to the cabinet 10 and arranged side by side in the horizontal direction, the third door 203 is located below the first door 201, the fourth door 204 is located below the second door 202, and the refrigerator 100 further includes a drawer 50 located below the third door 203 and the fourth door 204.

Here, the accommodating chamber S corresponding to the first door 201 and the second door 202 is configured as a refrigerating chamber; that is, the refrigerating chamber has a side-by-side structure; the third door 203 and the fourth door 204 correspond to two independent variable temperature compartments S1 respectively; the drawer 50 is configured as a freezing drawer.

It should be noted that the refrigerator 100 includes a fixed beam fixed inside the cabinet 10 and configured to separate the two variable temperature compartments S1, and the third door 203 and the fourth door 204 may be fitted with the fixed beam to achieve a sealing effect; that is, at this point, no vertical beam is required to be provided at the third door 203 and the fourth door 204.

It may be understood that the refrigerator 100 according to the present embodiment may have other structures, such as a side-by-side refrigerator including only the first door 201 and the second door 202, or the like.

In the present embodiment, the hinge assemblies 30 located at different regions of the door 20 have different structures; for example, a first hinge assembly 30*a* is located between an upper end of the first door 201 and the cabinet 10, a second hinge assembly 30*b* is located among a lower end of the first door 201, an upper end of the third door 203 and the cabinet 10, and a third hinge assembly 30*c* is located between a lower end of the third door 203 and the cabinet 10; the hinge assemblies 30 are symmetrically arranged left and right; that is, for descriptions of the hinge assemblies 30 at the second door 202, reference may be made to the descriptions of the first hinge assembly 30*a* and the second hinge assembly 30*b* at the first door 201, and for descriptions of the hinge assemblies 30 at the fourth door 204, reference may be made to the descriptions of the second hinge assembly 30*b* and the third hinge assembly 30*c* at the third door 203.

Here, the second hinge assembly 30*b* is located between the first door 201 and the third door 203; that is, the first door 201 and the third door 203 share the second hinge assembly 30*b*, and the second hinge assembly 30*b* may be processed adaptively.

Figure 15:
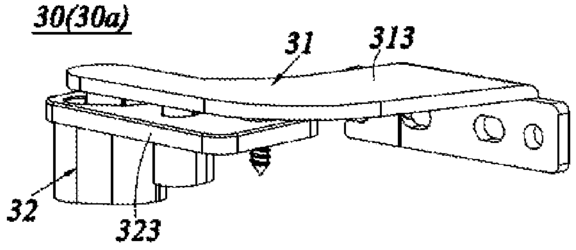
FIG. 15 is a schematic diagram of a first hinge assembly according to an embodiment of the present invention.
Figure 16:
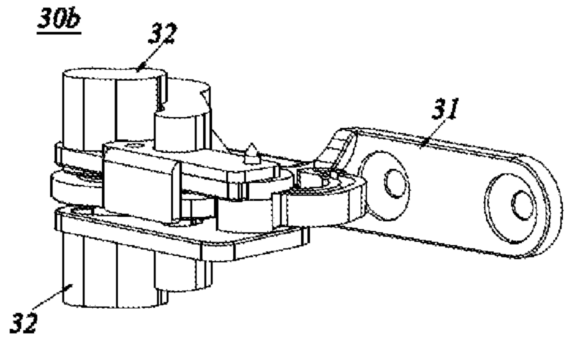
FIG. 16 is a schematic diagram of a second hinge assembly according to an embodiment of the present invention.
Figure 17:
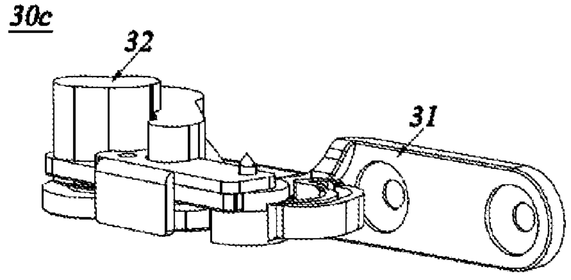
FIG. 17 is a schematic diagram of a third hinge assembly according to an embodiment of the present invention.
Figure 18:
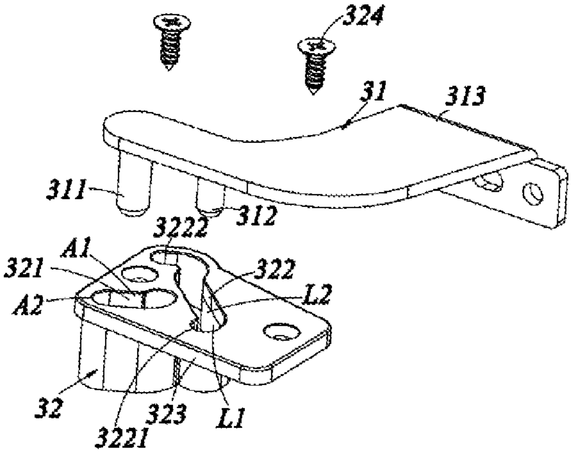
FIG. 18 is an exploded view of a first hinge assembly according to an embodiment of the present invention.

Referring to FIGS. 15 to 17, FIG. 15 is a schematic diagram of the first hinge assembly 30*a*, FIG. 16 is a schematic diagram of the second hinge assembly 30*b*, and FIG. 17 is a schematic diagram of the third hinge assembly 30*c*.

Next, the hinge assembly 30 according to the present embodiment is described by taking the first hinge assembly 30*a* located between the upper end of the first door 201 and the cabinet 10 as an example, and for the descriptions of the other hinge assemblies, reference may be made to the description of the first hinge assembly 30*a*.

With reference to FIGS. 18 to 28, in the present embodiment, the first groove 321 includes an initial position A1 and a first stop position A2, and the second groove 322 includes a first end 3221 and a second end 3222 opposite to each other; when the door 20 is in the closed state, the first shaft 311 is located at the initial position A1, and the second shaft 312 is located at the first end 3221, and when the door 20 is opened, the second shaft 312 moves in the second groove 322 to drive the first shaft 311 to move from the initial position A1 to the first stop position A2.

The cabinet 10 includes an outer side surface 12 adjacent to the hinge assembly 30 and on an extension section of a rotation path of the door 20, the door 20 includes a front wall 22 apart from the accommodating chamber S and a side wall 23 always clamped between the front wall 22 and the accommodating chamber S, and a side edge 24 is provided between the front wall 22 and the side wall 23.

Here, the outer side surface 12 is configured as a left side surface (corresponding to the left pivoting side P1) or a right side surface (corresponding to the right pivoting side P2) of the cabinet 10, different pivoting sides P correspond to different outer side surfaces 12, the front wall 22 is configured as a front surface of the door 20, and the side wall 23 is configured as a side surface of the door 20.

The second groove 322 includes a first section L1 and a second section L2 connected between the first end 3221 and the second end 3222.

Figure 19:
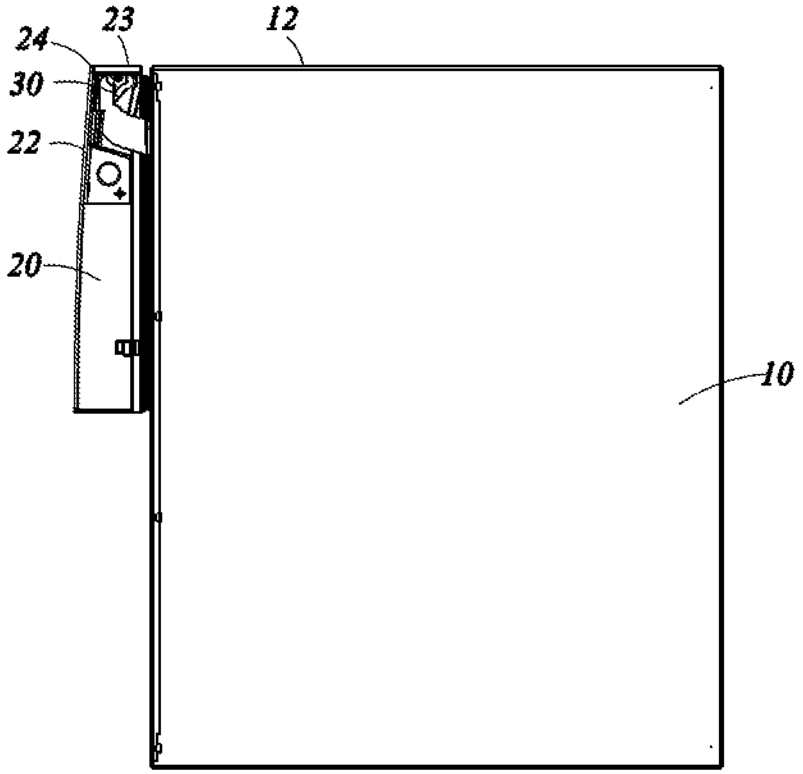
FIG. 19 is a top view in which a refrigerator is in a closed state according to an embodiment of the present invention.
Figure 20:
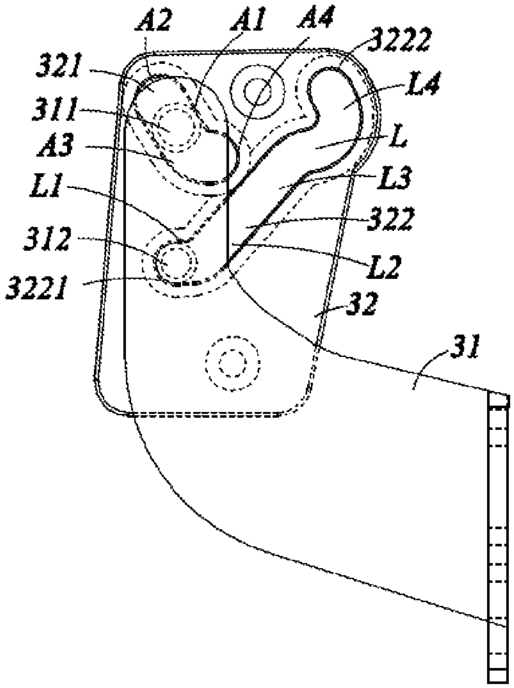
FIG. 20 is a perspective view of a hinge assembly in FIG. 19.

Referring to FIGS. 19 and 20, when the door 20 is in the closed state, the first fitting portion 21 and the second fitting portion 11 are engaged with each other; that is, the bump 21 is limited in the groove 11, the first shaft 311 is located at the initial position A1, and the second shaft 312 is located at the first end 3221.

Specifically, the bump 21 is limited in the groove 11, such that the vertical beam 40 extends to the second door 202; that is, at this point, the vertical beam 40 is attached to inner side surfaces of the first door 201 and the second door 202, so as to prevent cold air in the accommodating chamber S from leaking to the outside of the refrigerator 100.

In addition, the outer side surface 12 and the side wall 23 are located on a same plane, which may guarantee appearance smoothness, improve attractiveness, and facilitate a mounting process of the door 20, but the present invention is not limited thereto.

Figure 21:
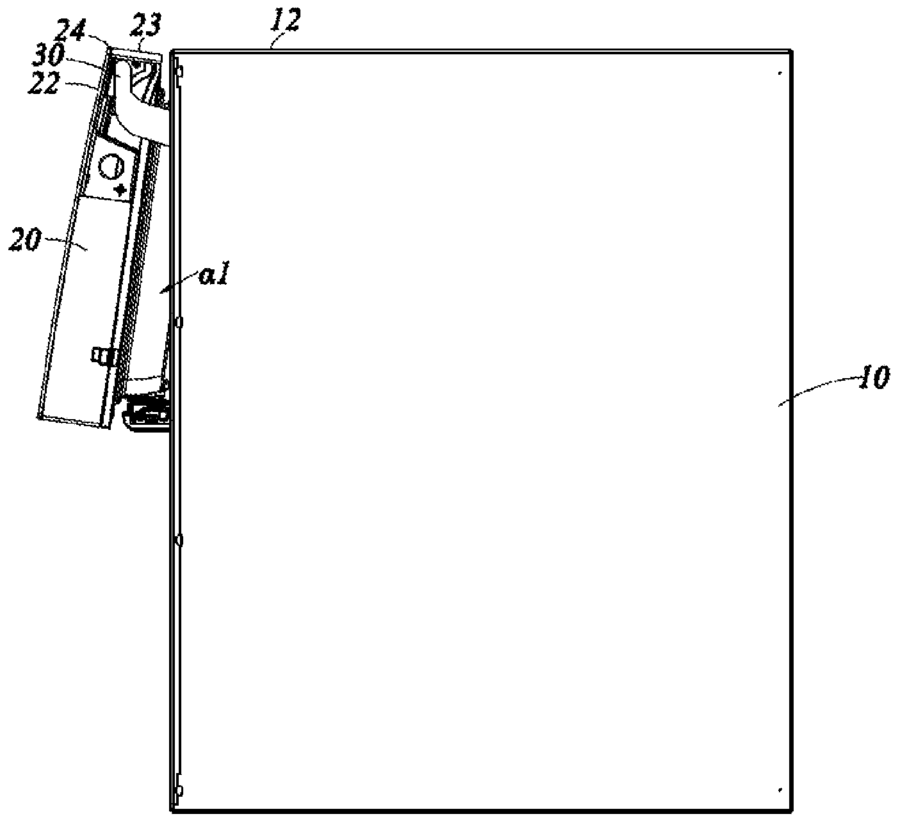
FIG. 21 is a top view in which a refrigerator is opened to a first opening angle according to an embodiment of the present invention.
Figure 22:
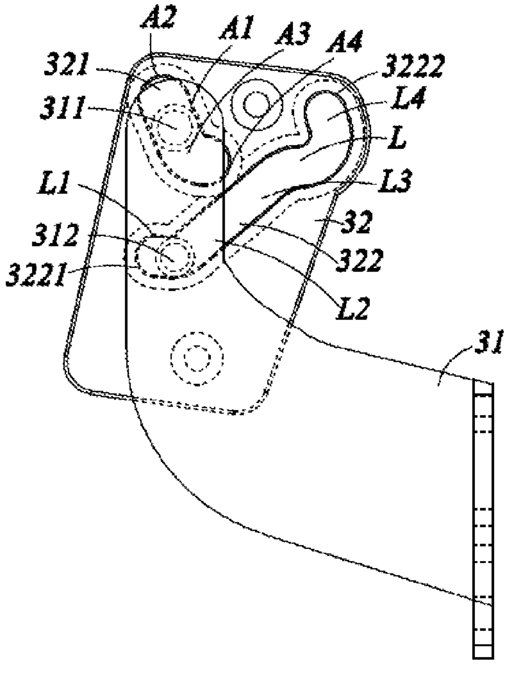
FIG. 22 is a perspective view of a hinge assembly in FIG. 21.

Referring to FIGS. 21 and 22, when the door 20 is opened from the closed state to the first opening angle α1, the first shaft 311 is kept at the initial position A1, and the second shaft 312 moves in the first section L1 around the first shaft 311, so as to drive the first fitting portion 21 to be disengaged from the second fitting portion 11.

Specifically, the bump 21 is gradually disengaged from the groove 11 through the notch 111, and at the same time, the vertical beam 40 rotates towards a side close to the accommodating chamber S, such that the first door 201 and the vertical beam 40 have a first folding angle β therebetween.

Here, when the bump 21 is completely disengaged from the groove 11, the first folding angle β is preferably kept less than 90 degrees, thus preventing the vertical beam 40 from affecting opening and closing operations of the second door 202.

It should be noted that, since an arc fit exists between the bump 21 and the groove 11, when the door 20 is in the closed state, the bump 21 and the groove 11 are limited in the first direction X or the second direction Y; when the door 20 is displaced in the first direction X or the second direction Y when opened to the first opening angle α1, the bump 21 and the groove 11 may interfere with each other and be jammed, such that the bump 21 is unable to be disengaged from the groove 11, and therefore, the door 20 is unable to be opened.

In the present embodiment, the door 20 rotates in situ relative to the cabinet 10 when the door 20 is opened to the first opening angle α1, thus ensuring that the door 20 is not displaced in the first direction X or the second direction Y in this process, and then ensuring that the bump 21 may be smoothly disengaged from the groove 11.

Here, the first opening angle is not greater than 10°; that is, the bump 21 may not be restricted by the groove 11 in the process of opening the door 20 to about 10°, and at this point, the bump 21 may be completely disengaged from the groove 11, or the bump 21 may not interfere with the groove 11 even when displaced in the first direction X or the second direction Y.

In addition, when the outer side surface 12 and the side wall 23 are located on the same plane when the door 20 is in the closed state, the side edge 24 protrudes out of the outer side surface 12 in the second direction Y in the rotation process (a protruding distance does not exceed 3 mm in general).

Figure 23:
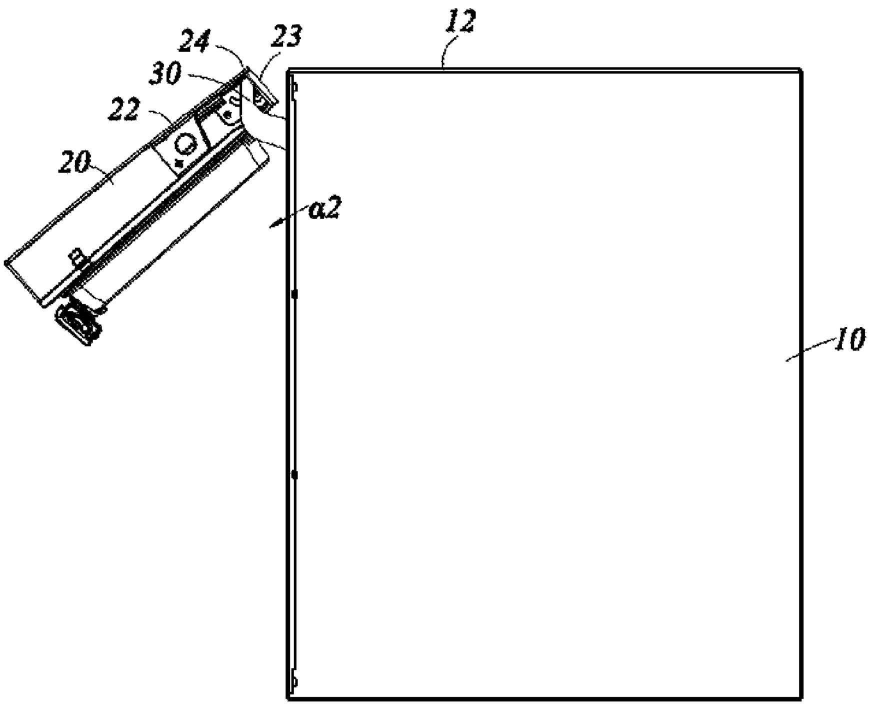
FIG. 23 is a top view in which a refrigerator is opened to a second opening angle according to an embodiment of the present invention.
Figure 24:
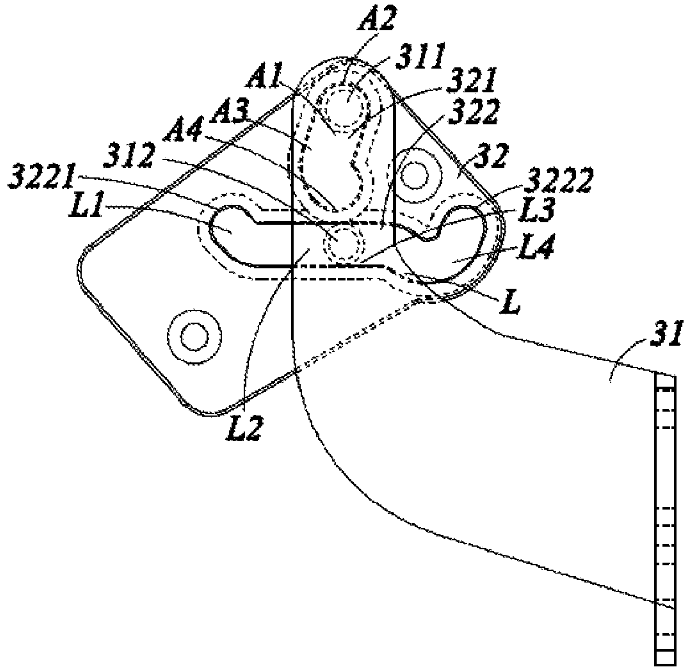
FIG. 24 is a perspective view of a hinge assembly in FIG. 23.

With reference to FIGS. 23 and 24, when the door 20 is continuously opened from the first opening angle α1 to the second opening angle α2, the second shaft 312 moves in the second section L2 to drive the first shaft 311 to move from the initial position A1 to the first stop position A2, and simultaneously, the second shaft 312 moves from the first position 3221 to the second position 3222.

Specifically, the vertical beam 40 and the first door 201 are kept relatively static; that is, at this point, the first folding angle β is kept between the vertical beam 40 and the first door 201; at this point, when the first door 201 is closed again, the bump 21 is inserted into the groove 11 through the notch 111 of the groove 11 and moves along an extending track of the groove 11, so as to drive the vertical beam 40 to gradually rotate to a fully unfolded state; that is, at this point, the vertical beam 40 is simultaneously attached to the inner side surfaces of the first door 201 and the second door 202.

In addition, the side edge 24 moves to a side of the outer side surface 12 close to the accommodating chamber S; that is, at this point, the hinge assembly 30 drives the side edge 24 to move towards the side close to the accommodating chamber S, such that interference between the side edge 24 and the peripheral cupboard or wall, or the like, due to the side edge 12 protruding out of the outer side surface 12 may be avoided in the opening process of the door 20.

Here, in order to guarantee the opening degree of the cabinet 10 as much as possible and avoid the problem that the drawers, the racks, or the like, in the cabinet 10 are unable to be opened due to interference of the door 20, the side edge 24 moves towards the side close to the accommodating chamber S into the plane of the outer side surface 12, and then, the hinge assembly 30 drives the side edge 24 to move in the plane and gradually approach the accommodating chamber S.

That is, at this point, on the basis of ensuring that the side edge 24 does not protrude out of the corresponding outer side surface 12, the side edge 24 is made to be as close as possible to the outer side surface 12, thus avoiding the interference between the door 20 and the peripheral cupboard or wall, or the like, in the opening process, and guaranteeing the opening degree of the cabinet 10 as much as possible.

In another embodiment, the first groove 321 further includes a second stop position A3 located on a side of the initial position A1 apart from the first stop position A2, and the second groove 322 further includes a third section L3 and a fourth section L4 located between the second section L2 and the second end 3222.

Figure 25:
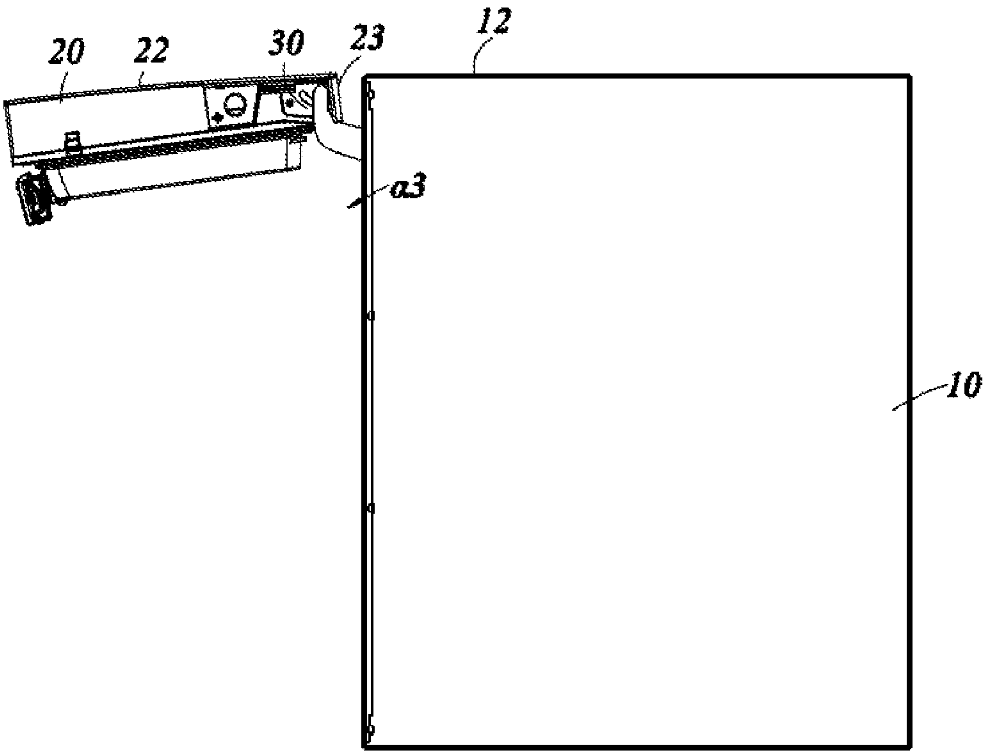
FIG. 25 is a top view in which a refrigerator is opened to a third opening angle according to an embodiment of the present invention.
Figure 26:
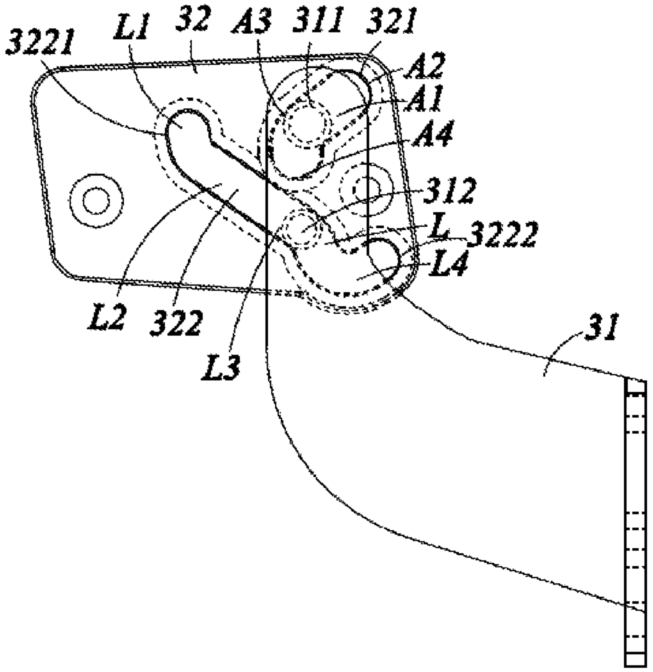
FIG. 26 is a perspective view of a hinge assembly in FIG. 25.

With reference to FIGS. 25 and 26, when the door 20 is continuously opened from the second opening angle α2 to the third opening angle α3, the second shaft 312 moves in the third section L3 to drive the first shaft 311 to move from the first stop position A2 to the second stop position A3, and at this point, the door 20 moves from the accommodating chamber S towards the pivoting side P, so as to prevent the door 20 from obstructing an opening operation of the drawers, the racks, or the like, in the cabinet 10.

Specifically, the vertical beam 40 and the first door 201 are kept relatively static.

In addition, the side edge 24 moves in the plane of the outer side surface 12 and gradually approaches the accommodating chamber S.

It may be understood that, when the door 20 is continuously opened from the second opening angle α2 to the third opening angle α3, when the door 20 rotates in situ relative to the cabinet 10, the side edge 24 gradually moves towards the side close to the accommodating chamber S, and meanwhile, the door 20 gradually moves close to the accommodating chamber S, and the door 20 may obstruct the opening operation of the drawers, the racks, or the like, in the cabinet 10; that is, the opening degree of the cabinet 10 may be reduced.

The hinge assembly 30 according to the present embodiment drives the side edge 24 to move in the plane of the outer side surface 12; that is, the door 20 may be as far away from the cabinet 10 as possible, thus guaranteeing the opening degree of the cabinet 10, avoiding the problem that the drawers, the racks, or the like, in the cabinet 10 are unable to be opened due to the interference of the door 20, and also preventing the side edge 24 from protruding out of the outer side surface 12 in a direction apart from the accommodating chamber S.

Figure 27:
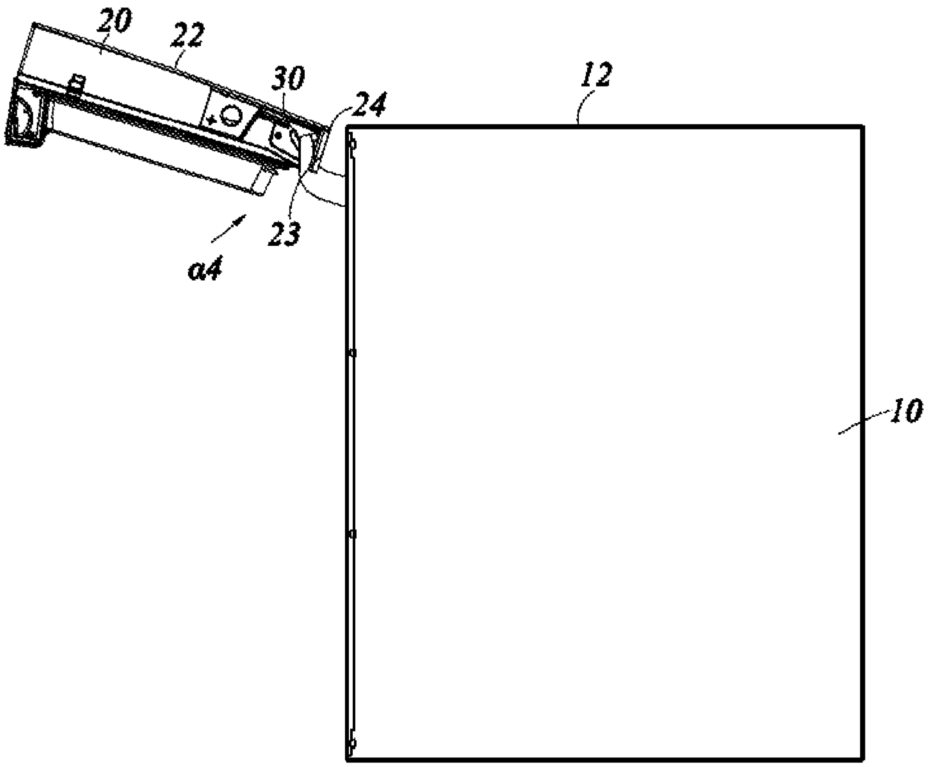
FIG. 27 is a top view in which a refrigerator is opened to a maximum opening angle according to an embodiment of the present invention.
Figure 28:
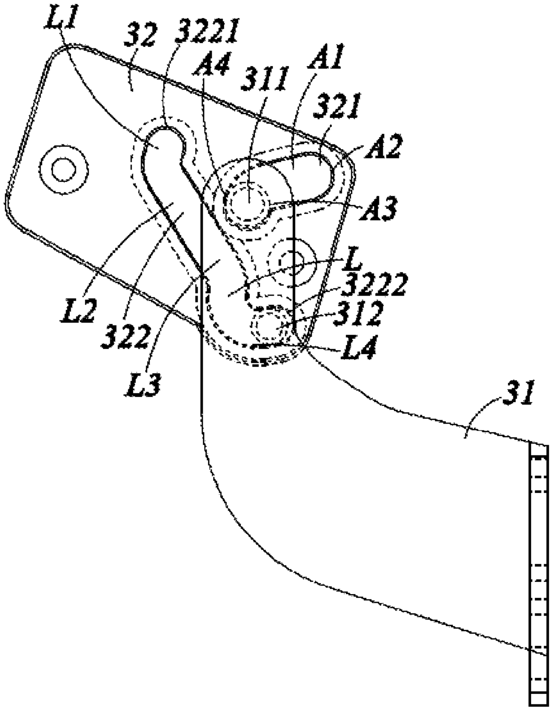
FIG. 28 is a perspective view of a hinge assembly in FIG. 27.

With reference to FIGS. 27 and 28, when the door 20 is continuously opened from the third opening angle α3 to the maximum opening angle α4, the first shaft 311 is kept at the second stop position A3, and the second shaft 312 moves in the fourth section L4 around the first shaft 311.

Here, the side edge 24 is always located on the side of the outer side surface 12 close to the accommodating chamber S.

In addition, the second opening angle is not greater than 90°, the third opening angle is 90°, and the maximum opening angle is greater than 90°; that is, in the process of opening the door 20 to 90°, the door 20 is first displaced in the first direction X to prevent the door 20 from interfering with the peripheral cupboard or wall, or the like, in the opening process, and then, the door 20 is displaced in the second direction Y to prevent the door 20 from obstructing the opening operation of the drawers, the racks, or the like, in the cabinet 10, and finally, after opened to 90°, the door 20 rotates in situ relative to the cabinet 10 to be further opened.

It may be understood that, when the door 20 is opened from the closed state to the first opening angle α1, since the door 20 rotates in situ relative to the cabinet 10, the door 20 slightly protrudes out of the cabinet 10 towards the side (left side) apart from the accommodating chamber S; when the door 20 is continuously opened from the first opening angle α1 to the second opening angle α2, the displacement of the door 20 in the first direction X may counteract the entire part of the door 20 protruding out of the cabinet 10 in the second direction Y during the whole rotation process; then, when the door 20 is continuously opened from the second opening angle α2 to the third opening angle α3, the displacement of the door 20 in the second direction Y may make the door 20 not protrude out of the cabinet 10 and guarantee the opening degree of the cabinet 10 as much as possible.

In other embodiments, the first groove 321 further includes a pivoting position A4 located on a side of the second stop position A3 apart from the initial position A1, the second groove 322 further includes a transition section L located between the third section L3 and the fourth section L4, and a connecting line of the second stop position A3 and the pivoting position A4 is parallel to the transition section L.

The first stop position A2, the initial position A1, and the second stop position A3 are located on a straight line, while the pivoting position A4 is not located on the straight line, and an included angle is formed between the pivoting position A4 and the straight line.

When the door 20 is continuously opened from the third opening angle α3 to the maximum opening angle α4, the second shaft 312 moves in the transition section L to drive the first shaft 311 to move from the second stop position A3 to the pivoting position A4, and then, the first shaft 311 is kept at the pivoting position A4, and the second shaft 312 moves in the fourth section L4 around the first shaft 311.

Here, when the door 20 rotates in situ relative to the cabinet 10 to be further opened, when the first shaft 311 is kept at the second stop position A3, since a parallel part exists between the fourth section L and a part between the first stop position A2 and the second stop position A3, the door 20 may slide or sway.

In the present embodiment, when the second shaft 312 moves in the fourth section L4, the first shaft 311 is kept at the pivoting position A4 without swaying, thus solving the problem that the door 20 laterally slides or sways.

In the present embodiment, a first connecting line of the center of the first shaft 311 at the initial position A1, the center of the first shaft 311 at the first stop position A2, and the center of the first shaft 311 at the second stop position A3 passes through the side edge 24 of the door 20.

A distance between the center of the first shaft 311 at the initial position A1 and the side edge 24 is greater than a distance between the center of the first shaft 311 at the first stop position A2 and the side edge 24, and less than a distance between the center of the first shaft 311 at the second stop position A3 and the side edge 24.

A distance between the center of the first shaft 311 at the initial position A1 and the front wall 22 is greater than a distance between the center of the first shaft 311 at the first stop position A2 and the front wall 22, and less than a distance between the center of the first shaft 311 at the second stop position A3 and the front wall 22.

A distance between the center of the first shaft 311 at the initial position A1 and the side wall 23 is greater than a distance between the center of the first shaft 311 at the first stop position A2 and the side wall 23, and less than a distance between the center of the first shaft 311 at the second stop position A3 and the side wall 23.

A first distance exists between the center of the first shaft 311 and the side edge 24, a second distance exists between the center of the first shaft 311 and the front wall 22, a third distance exists between the center of the first shaft 311 and the side wall 23, and the first distance, the second distance and the third distance are changed in the opening process of the door 20.

When the door 20 is continuously opened from the first opening angle α1 to the second opening angle α2, the first distance, the second distance and the third distance all decrease, and when the door 20 is continuously opened from the second opening angle α2 to the third opening angle α3, the first distance, the second distance and the third distance all increase, and when the door 20 continuously opened from the third opening angle α3 to the maximum opening angle α4, the first distance, the second distance and the third distance are all kept unchanged.

In another embodiment of the present invention, referring to FIGS. 1 to 28, a refrigerator 100 with a decorative sheet includes a cabinet 10, a door 20 for opening and closing the cabinet 10, and a hinge assembly 30 for connecting the cabinet 10 and the door 20.

The cabinet 10 includes an accommodating chamber S and a pivoting side P connected with the hinge assembly 30.

The hinge assembly 30 includes a first hinge part 32 located at the door 20 and a second hinge part 31 located at the cabinet 10.

The decorative sheet 60 is provided between the first hinge part 32 and the second hinge part 31, and the decorative sheet 60 is detachably fitted with the first hinge part 32.

The first hinge part 32 includes a first driving part, and the second hinge part 31 includes a second driving part.

The hinge assembly 30 includes a first shaft 311, a first groove 321, a second shaft 312 and a second groove 322, the first shaft 311 and the first groove 321 are fitted with each other, the second shaft 312 and the second groove 322 are fitted with each other, the first shaft 311 is used as one of the first driving part and the second driving part, the first groove 321 is used as the other of the first driving part and the second driving part, the second shaft 312 is used as one of the first driving part and the second driving part, and the second groove 322 is used as the other of the first driving part and the second driving part.

The first groove 321 includes an initial position A1 and a first stop position A2, and the second groove 322 includes a first end 3221 and a second end 3222 opposite to each other.

When the door 20 is in a closed state, the first shaft 311 is located at the initial position A1, and the second shaft 312 is located at the first end 3221.

In an opening process of the door 20, the second shaft 312 moves in the second groove 322 to drive the first shaft 311 to move from the initial position A1 to the first stop position A2, and the door 20 moves from the pivoting side P towards the accommodating chamber S.

In the present embodiment, the door 20 may be prevented from interfering with a peripheral cupboard or wall, or the like, in the opening process, and the refrigerator is suitable for an embedded cupboard or a scenario with a small space for accommodating the refrigerator 100.

In another embodiment, the door 20 includes a first fitting portion 21, the cabinet 10 includes a second fitting portion 11, the first groove 321 further includes a second stop position A3 located at a side of the first stop position A2 apart from the initial position A1, and the second groove 322 includes a first section L1, a second section L2, a third section L3, and a fourth section L4, which are connected in sequence.

When the door 20 is in the closed state, the first fitting portion 21 and the second fitting portion 11 are engaged with each other, the first shaft 311 is located at the initial position A1, and the second shaft 312 is located at a side of the first section L1 apart from the second section L2.

When the door 20 is opened from the closed state to a first opening angle α1, the first shaft 311 is kept at the initial position A1, and the second shaft 312 moves in the first section L1 around the first shaft 311, so as to drive the first fitting portion 21 to be disengaged from the second fitting portion 11, and a first engaging portion 61 is disengaged from a second engaging portion 62.

When the door 20 is continuously opened from the first opening angle α1 to a second opening angle α2, the second shaft 312 moves in the second section L2 to drive the first shaft 311 to move from the initial position A1 to the first stop position A2, and the door 20 moves from the pivoting side P towards the accommodating chamber S.

When the door 20 is continuously opened from the second opening angle α2 to a third opening angle α3, the second shaft 312 moves in the third section L3 to drive the first shaft 311 to move from the first stop position A2 to the second stop position A3.

When the door 20 is continuously opened from the third opening angle α3 to a maximum opening angle α4, the first shaft 311 is kept at the second stop position A3, and the second shaft 312 moves in the fourth section L4 around the first shaft 311.

In the present embodiment, the first fitting portion 21 may be guaranteed to be smoothly disengaged from the second fitting portion 11, the first engaging portion 61 may be guaranteed to be smoothly disengaged from the second engaging portion 62, the door 20 may be prevented from interfering with the peripheral cupboard or wall, or the like, in the opening process, the refrigerator is suitable for the embedded cupboard or the scenario with a small space for accommodating the refrigerator 100, and in addition, the cabinet 10 may be guaranteed to have a sufficient opening degree.

For other descriptions of the present embodiment, reference may be made to the foregoing description, which is not repeated herein.

In summary, in the present invention, the first fitting portion 21 may be guaranteed to be smoothly disengaged from the second fitting portion 11 by the fitting structure of the first shaft 311, the first groove 321, the second shaft 312 and the second groove 322; the inclusion of the vertical beam 40 by the refrigerator 100 may ensure that the bump 21 on the vertical beam 40 is smoothly disengaged from the groove 11 on the cabinet 10 without interference with each other at the initial opening stage of the door 20, and then, the door 20 moves from the pivoting side P towards the accommodating chamber S during the continuous opening process of the door 20, so as to prevent the door 20 from interfering with the peripheral cupboard or wall, or the like, in the opening process, and the refrigerator is suitable for the embedded cupboard or the scenario with a small space for accommodating the refrigerator 100; in addition, when the opening angle of the door 20 is greater, the door 20 moves from the accommodating chamber S towards the pivoting side P to prevent the door 20 from obstructing the opening operation of the drawers, the racks, or the like, in the cabinet 10.

The above embodiments are merely used for explaining the technical solution of the present invention and not limiting. Although the present invention has been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A hinge assembly with a decorative sheet, comprising a first hinge part, a second hinge part and the decorative sheet, wherein the first hinge part, the second hinge part and the decorative sheet are fitted with one another, the decorative sheet is provided between the first hinge part and the second hinge part, and the decorative sheet is detachably fitted with the first hinge part;

wherein the hinge assembly comprises a first shaft and a first groove fitted with each other, the first shaft is provided on one of the first hinge part and the second hinge part, the first groove is provided in the other of the first hinge part and the second hinge part, and the decorative sheet comprises a first slot matched with the first groove, the first slot and the first groove are always kept relatively stationary, the first shaft passes through the first slot and the first groove in turn, and the first shaft moves relative to the first slot and the first groove when the first hinge part moves relative to the second hinge part;

wherein the decorative sheet comprises a hook and a second slot, and the hook is clamped with a side edge of the first hinge part;

wherein the hinge assembly comprises shafts and grooves respectively correspondingly fitted with each other, the grooves comprise the first groove and a second groove, the shafts comprise the first shaft and a second shaft, the first shaft is fitted with the first groove, the second shaft is fitted with the second groove, the second shaft is located in the one of the first hinge part and the second hinge part, and the second groove is located in the other of the first hinge part and the second hinge part, the second slot is matched with the second groove, and the second shaft passes through the second slot and the second groove in turn.

2. The hinge assembly with a decorative sheet according to claim 1, wherein the first hinge part comprises a first hinge part body and the first groove located at the first hinge part body, the first groove comprises a protruding portion protruding from a surface of the first hinge part body, and the first slot and the protruding portion are matched with each other.

3. The hinge assembly with a decorative sheet according to claim 1, wherein the first groove and the second groove are located at the first hinge part, and the first shaft and the second shaft are located at the second hinge part.

4. The hinge assembly with a decorative sheet according to claim 1, wherein the first hinge part is configured as a plastic part, and the decorative sheet is configured as a metal part.

5. A refrigerator, comprising a cabinet, a door and the hinge assembly with a decorative sheet according to claim 1, wherein the first hinge part is connected with the door, the second hinge part is connected with the cabinet, the door further comprises a door trim, and the door trim has a mounting groove for accommodating the first hinge part.

6. The refrigerator according to claim 5, wherein the first hinge part comprises a first mounting fixing hole and a first combining fixing hole, the mounting groove comprises a second mounting fixing hole and a second combining fixing hole, the decorative sheet comprises a third combining fixing hole, the first mounting fixing hole and the second mounting fixing hole are locked by a mounting screw, and the first combining fixing hole, the second combining fixing hole, and the third combining fixing hole are locked by a combining screw.

7. The refrigerator according to claim 6, wherein the decorative sheet comprises a covering portion, and the covering portion shields the first mounting fixing hole and the mounting screw.

8. A refrigerator, comprising a cabinet, a door for opening and closing the cabinet, and a hinge assembly for connecting the cabinet and the door, wherein the hinge assembly is the hinge assembly according to claim 1, and the cabinet comprises an accommodating chamber and a pivoting side connected with the hinge assembly; when the door is opened, the hinge assembly drives the door to move from the pivoting side to the accommodating chamber.

9. The refrigerator according to claim 8, wherein the first groove comprises an initial position and a first stop position, and the second groove comprises a first end and a second end opposite to each other; when the door is in a closed state, the first shaft is located at the initial position, and the second shaft is located at the first end, and when the door is opened, the second shaft moves in the second groove to drive the first shaft to move from the initial position to the first stop position.

10. The refrigerator according to claim 9, wherein the second groove comprises a first section and a second section connected between the first end and the second end; when the door is opened from the closed state to a first opening angle, the first shaft is kept at the initial position, and the second shaft moves in the first section around the first shaft, and when the door is continuously opened from the first opening angle to a second opening angle, the second shaft moves in the second section to drive the first shaft to move from the initial position to the first stop position.

11. The refrigerator according to claim 10, wherein the door is provided with a first fitting portion, the cabinet is provided with a second fitting portion, the first fitting portion and the second fitting portion are engaged with each other when the door is in the closed state, and when the door is opened from the closed state to the first opening angle, the second shaft moves in the first section around the first shaft to drive the first fitting portion to be disengaged from the second fitting portion.

12. The refrigerator according to claim 11, wherein the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the first door and the second door are in the closed state, the vertical beam extends to the second door; when the first door is opened from the closed state to the first opening angle, the vertical beam rotates towards a side close to the accommodating chamber, such that a first folding angle is formed between the first door and the vertical beam, and when the first door is continuously opened from the first opening angle to the second opening angle, the vertical beam and the first door are kept relatively static.

13. The refrigerator according to claim 10, wherein the first groove further comprises a second stop position located on a side of the initial position apart from the first stop position, and the second groove further comprises a third section and a fourth section located between the second section and the second end; when the door is continuously opened from the second opening angle to a third opening angle, the second shaft moves in the third section to drive the first shaft to move from the first stop position to the second stop position, and when the door is continuously opened from the third opening angle to a maximum opening angle, the first shaft is kept at the second stop position, and the second shaft moves in the fourth section around the first shaft.

14. A refrigerator, comprising a cabinet, a door for opening and closing the cabinet, and a hinge assembly for connecting the cabinet and the door, wherein the hinge assembly comprises a first hinge part, a second hinge part and a decorative sheet, the first hinge part, the second hinge part and the decorative sheet are fitted with one another, the decorative sheet is provided between the first hinge part and the second hinge part, and the decorative sheet is detachably fitted with the first hinge part, and the cabinet comprises an accommodating chamber and a pivoting side connected with the hinge assembly; when the door is opened, the hinge assembly drives the door to move from the pivoting side to the accommodating chamber;

wherein the hinge assembly comprises shafts and grooves respectively correspondingly fitted with each other, the grooves comprise a first groove and a second groove, the shafts comprise a first shaft and a second shaft, the first groove comprises an initial position and a first stop position, and the second groove comprises a first end and a second end opposite to each other; when the door is in a closed state, the first shaft is located at the initial position, and the second shaft is located at the first end, and when the door is opened, the second shaft moves in the second groove to drive the first shaft to move from the initial position to the first stop position;

wherein the second groove comprises a first section and a second section connected between the first end and the second end; when the door is opened from the closed state to a first opening angle, the first shaft is kept at the initial position, and the second shaft moves in the first section around the first shaft, and when the door is continuously opened from the first opening angle to a second opening angle, the second shaft moves in the second section to drive the first shaft to move from the initial position to the first stop position; and wherein the door is provided with a first fitting portion, the cabinet is provided with a second fitting portion, the first fitting portion and the second fitting portion are engaged with each other when the door is in the closed state, and when the door is opened from the closed state to the first opening angle, the second shaft moves in the first section around the first shaft to drive the first fitting portion to be disengaged from the second fitting portion.

15. A refrigerator, comprising a cabinet, a door for opening and closing the cabinet, and a hinge assembly for connecting the cabinet and the door, wherein the hinge assembly comprises a first hinge part, a second hinge part and a decorative sheet, the first hinge part, the second hinge part and the decorative sheet are fitted with one another, the decorative sheet is provided between the first hinge part and the second hinge part, and the decorative sheet is detachably fitted with the first hinge part, and the cabinet comprises an accommodating chamber and a pivoting side connected with the hinge assembly; when the door is opened, the hinge assembly drives the door to move from the pivoting side to the accommodating chamber;

wherein the hinge assembly comprises shafts and grooves respectively correspondingly fitted with each other, the grooves comprise a first groove and a second groove, the shafts comprise a first shaft and a second shaft, the first groove comprises an initial position and a first stop position, and the second groove comprises a first end and a second end opposite to each other; when the door is in a closed state, the first shaft is located at the initial position, and the second shaft is located at the first end, and when the door is opened, the second shaft moves in the second groove to drive the first shaft to move from the initial position to the first stop position;

wherein the second groove comprises a first section and a second section connected between the first end and the second end; when the door is opened from the closed state to a first opening angle, the first shaft is kept at the initial position, and the second shaft moves in the first section around the first shaft, and when the door is continuously opened from the first opening angle to a second opening angle, the second shaft moves in the second section to drive the first shaft to move from the initial position to the first stop position; and wherein the first groove further comprises a second stop position located on a side of the initial position apart from the first stop position, and the second groove further comprises a third section and a fourth section located between the second section and the second end; when the door is continuously opened from the second opening angle to a third opening angle, the second shaft moves in the third section to drive the first shaft to move from the first stop position to the second stop position, and when the door is continuously opened from the third opening angle to a maximum opening angle, the first shaft is kept at the second stop position, and the second shaft moves in the fourth section around the first shaft.

* * * * *